US011866991B1

(12) United States Patent
Fernandez

(10) Patent No.: US 11,866,991 B1
(45) Date of Patent: Jan. 9, 2024

(54) DETACHABLE DOOR SYSTEMS

(71) Applicant: Ricardo Fernandez, Tempe, AZ (US)

(72) Inventor: Ricardo Fernandez, Tempe, AZ (US)

( * ) Notice: Subject to any disclaimer, the term of this patent is extended or adjusted under 35 U.S.C. 154(b) by 18 days.

(21) Appl. No.: 17/456,805

(22) Filed: Nov. 29, 2021

Related U.S. Application Data

(63) Continuation-in-part of application No. 16/864,687, filed on May 1, 2020, now Pat. No. 11,274,491, which is a continuation-in-part of application No. 15/973,121, filed on May 7, 2018, now Pat. No. 10,961,770, which is a continuation-in-part of application No. 15/205,902, filed on Jul. 8, 2016, now abandoned.

(51) Int. Cl.
*E06B 7/32* (2006.01)
*F24F 13/02* (2006.01)

(52) U.S. Cl.
CPC ............ *E06B 7/32* (2013.01); *F24F 13/0254* (2013.01)

(58) Field of Classification Search
CPC ............. E05D 11/1007; E05D 11/1028; E05D 11/105; E05D 11/1014; E06B 7/32; E06B 2003/7057; E05C 9/10; E05C 9/14
See application file for complete search history.

(56) References Cited

U.S. PATENT DOCUMENTS

| | | | |
|---|---|---|---|
| 1,204,833 | A | 11/1916 | Warfel |
| 2,779,401 | A | 1/1957 | Bascom |
| 2,790,414 | A | 4/1957 | Rossow |
| 3,060,525 | A | 10/1962 | Migneault et al. |
| 3,464,158 | A | 9/1969 | Greene |
| 3,675,402 | A | 7/1972 | Weed |
| 3,738,322 | A | 6/1973 | Smith |
| 3,878,645 | A | 4/1975 | Porter |
| 3,918,203 | A | 11/1975 | Ellison, Jr. |
| 4,047,331 | A | 9/1977 | Davlantes |
| 4,053,007 | A | 10/1977 | Griffith |
| 4,103,458 | A | 8/1978 | Booker |
| 4,322,913 | A | 4/1982 | Himmer |
| 4,738,053 | A | 4/1988 | Biesenthal |
| 4,760,872 | A | 8/1988 | Hale, Jr. |
| 4,908,978 | A | 3/1990 | Zacharias |

(Continued)

FOREIGN PATENT DOCUMENTS

| | | | |
|---|---|---|---|
| DE | 9420721.6 U1 | | 7/1995 |
| KR | 10-2013-0084560 | * | 7/2013 |
| WO | 2016043795 A1 | | 3/2016 |

*Primary Examiner* — Gregory J Strimbu
(74) *Attorney, Agent, or Firm* — IPTechLaw

(57) ABSTRACT

Implementations of detachable door systems may include: a main panel, an upper panel, and a connection mechanism by which an upper side of the main panel hingedly couples to the upper panel. The connection mechanism may include a hinge locking system with a fixed open position and a closed position and with a fixed bracket secured to the main panel, the fixed bracket hingedly coupled to a non-fixed bracket that is secured to the upper panel. A locking pin may be configured to engage in a first pair of slots in the fixed bracket corresponding with the fixed open position and configured to engage in a second pair of slots in the fixed bracket corresponding with the closed position. A removable fastener may be included to prevent the locking pin from engaging in the second pair of slots corresponding with the closed position.

14 Claims, 22 Drawing Sheets

(56) References Cited

U.S. PATENT DOCUMENTS

| | | | |
|---|---|---|---|
| 4,908,990 A | 3/1990 | Yoon et al. | |
| 5,117,890 A | 6/1992 | Taylor et al. | |
| 5,269,097 A | 12/1993 | Davlantes | |
| 5,581,940 A | 12/1996 | Peterson | |
| 5,586,796 A | 12/1996 | Fraser | |
| 5,735,079 A | 4/1998 | Davlantes | |
| 5,927,011 A | 7/1999 | Sickenius | |
| 5,946,855 A | 9/1999 | Miconi | |
| 5,992,096 A | 11/1999 | De La Cerda et al. | |
| 6,038,738 A * | 3/2000 | Neag | E05D 11/1007 16/371 |
| 6,164,013 A | 12/2000 | Ramsey | |
| 6,357,509 B1 | 3/2002 | Lamazares | |
| 6,385,909 B1 | 5/2002 | Marsh et al. | |
| 6,394,005 B1 * | 5/2002 | Isensee | A47B 3/0815 108/132 |
| 6,668,487 B2 | 12/2003 | Vesey | |
| 7,063,123 B2 | 6/2006 | Ethers | |
| 7,159,361 B1 | 1/2007 | Hale, Jr. | |
| 7,913,454 B2 | 3/2011 | Sullivan | |
| 8,176,962 B2 | 5/2012 | Kilfoyle | |
| 8,333,037 B2 | 12/2012 | Sullivan | |
| 8,434,264 B2 | 5/2013 | Bosserdet, Jr. | |
| 8,484,896 B1 | 7/2013 | Skubiak, Jr. | |
| 8,567,137 B2 | 10/2013 | Sullivan | |
| 10,435,942 B1 | 10/2019 | Dunavin | |
| 10,961,770 B1 * | 3/2021 | Fernandez | E06B 9/02 |
| 11,560,752 B1 * | 1/2023 | Fernandez | E06B 7/32 |
| 2002/0150434 A1 | 10/2002 | Sommerfeld et al. | |
| 2005/0050833 A1 | 3/2005 | Spray | |
| 2005/0183641 A1 * | 8/2005 | Suzuki | A47B 3/0815 108/129 |
| 2005/0284402 A1 | 12/2005 | Becker | |
| 2006/0201638 A1 | 9/2006 | Hesketh | |
| 2008/0168712 A1 | 7/2008 | McDermott | |
| 2010/0282181 A1 | 11/2010 | Turner | |
| 2010/0307383 A1 * | 12/2010 | Hoffman | E05D 11/1028 108/6 |
| 2011/0023365 A1 | 2/2011 | Kilfoyle | |
| 2011/0047873 A1 | 3/2011 | Kuhn et al. | |
| 2012/0304937 A1 | 12/2012 | Matteson et al. | |
| 2015/0337584 A1 * | 11/2015 | Zetti | E05F 3/20 16/50 |
| 2021/0140213 A1 * | 5/2021 | Bolden | E05D 15/12 |

* cited by examiner

DETACHABLE DOOR SYSTEMS

CROSS REFERENCE TO RELATED APPLICATIONS

This application is a continuation-in-part application of the earlier U.S. Utility Patent Application to Ricardo Fernandez entitled "Pet Door and Detachable Window Systems," application Ser. No. 16/864,687, filed May 1, 2020, now pending; which application is a continuation-in-part application of the earlier U.S. Utility Patent Application to Ricardo Fernandez entitled "Pet Door Systems," application Ser. No. 15/973,121, filed May 7, 2018, now U.S. Pat. No. 10,961,770, issued Mar. 30, 2021; which was a continuation-in-part application of the earlier U.S. Utility Patent Application to Ricardo Fernandez entitled "Pet Door Systems," application Ser. No. 15/205,902, filed Jul. 8, 2016, abandoned on Aug. 22, 2018, the disclosure of which is hereby incorporated entirely herein by reference.

BACKGROUND

1. Technical Field

Aspects of this document relate generally to pet doors, detachable door and window systems, such as systems for allowing pets to enter a home or other structure, or for allowing exhaust to exit a home or other structure.

2. Background

Pet doors are used to allow animals, such as dogs or cats, to enter a home or other structure through an opening sized to receive them. An example of a conventional pet doors can be found in U.S. Pat. No. 3,878,645 to Robert C. Porter, issued Apr. 22, 1975, entitled "Pet Door Device," (the '645 patent) the disclosure of which is hereby incorporated entirely herein by reference.

SUMMARY

Implementations of detachable window systems may include one, all, or any of the following:

A main panel, an upper panel, and a connection mechanism by which an upper side of the main panel hingedly couples to the upper panel, and the main panel is configured to couple with a door casing. The connection mechanism may include a hinge locking system capable of a fixed open position and a closed position. The hinge locking system may include a fixed bracket secured to the main panel, the fixed bracket may be hingedly coupled to a non-fixed bracket that is secured to the upper panel. The locking pin may be configured to engage in a pair of slots in the fixed bracket corresponding with the fixed open position and movable slidably into a pair of slots in the fixed bracket corresponding with the closed position. The systems may further include a removable fastener configured to prevent the locking pin from moving slidably into the pair of slots corresponding with the closed position.

The removable fastener may be configured to couple the locking pin to the main panel and prevent the locking pin from moving slidably into the pair of slots corresponding to the closed position.

Detachable door systems may further include a second connection mechanism configured to allow a lower panel to hingedly couple to a lower side of the main panel where the second connection comprises a second hinge locking system.

The main panel attaches to the door casing using a deadbolt coupling system coupled on a side of the main panel. The deadbolt coupling system may include a deadbolt bar coupled to a mounting plate where the deadbolt bar may be configured to couple into a deadbolt strike plate opening of a door casing.

The main panel may include one or more windows therein. The one or more windows may be configured to be mechanically openable by a user.

Detachable door systems may further include a door stop coupled along a side of the main panel. The door stop may include a deadbolt strike plate, a door latch strike plate, or both a deadbolt strike plate and a door latch strike plate.

Detachable door systems may further include a locking system comprising a toggle latch coupled along and to a side of the main panel and a hook, the hook having a first curved end and a second curved end. The first curved end of the hook coupled with a door knob of a door hung within the door casing and the second curved end of the hook coupled with a ring extending from the toggle latch.

Implementations of detachable door systems may include a main panel with at least one opening configured to receive an exhaust hose, an upper panel, and a connection mechanism by which an upper side of the main panel hingedly couples to the upper panel. The main panel is configured to couple with a door casing. A deadbolt coupling system may be coupled on a side of the main panel. The deadbolt coupling system may include a deadbolt bar coupled to a mounting plate. The deadbolt bar may be configured to couple into a deadbolt strike plate opening of the door casing to secure the main panel thereto.

Detachable door systems may further include a connection mechanism hingedly coupling a lower panel to a lower side of the main panel.

The main panel may include one or more windows therein, the one or more windows may be configured to be mechanically openable by a user.

Detachable door systems may further include a door stop coupled on a side of the main panel opposing the side of the deadbolt coupling system. The door stop may include a deadbolt strike plate, a door latch strike plate, or both a deadbolt strike plate and a door latch strike plate.

The main panel may further include an exhaust vent opposite the side configured to receive the exhaust hose.

Detachable door systems may further include a locking system comprising a toggle latch coupled along and to a side of the main panel and a hook. The hook may include a first curved end and a second curved end. The first curved end of the hook may be coupled with a door knob of a door hung within the door casing and the second curved end of the hook coupled with a ring extending from the toggle latch.

Implementations of the detachable door systems may include a main panel comprising at least one opening configured to receive an exhaust hose, an upper panel, and a connection mechanism hingedly coupling the main panel with the upper panel. The connection mechanism may include a hinge locking system configured to move to a fixed open position and to a closed position. The hinge locking system may further include a fixed bracket secured to the main panel and hingedly coupled to a non-fixed bracket secured to the upper panel. The systems may further include a locking pin may be configured to engage with a pair of slots in the fixed bracket corresponding to the fixed open position and movable slidably into a pair of slots in the fixed bracket corresponding to the closed position. The systems may further include a removable fastener configured to prevent the locking pin from moving slidably into the pair of slots corresponding to the closed position.

The removable fastener is configured to couple the locking pin to the main panel to prevent the locking pin from moving slidably into the pair of slots corresponding to the closed position.

Detachable door systems may further include a second connection mechanism hingedly coupling a lower panel to a lower side of the main panel. The connection mechanism may further include a second hinge locking system.

The main panel may be configured to couple with the door casing using a deadbolt coupling system coupled on a side of the main panel. The deadbolt coupling system may further include a deadbolt bar coupled to a mounting plate. The deadbolt bar may be configured to couple into a deadbolt strike plate opening of a door casing.

The main panel may include one or more windows therein. The one or more windows may be configured to be mechanically openable by a user.

Detachable door systems may further include a door stop coupled along a side of the main panel. The door stop may include a deadbolt strike plate, a door latch strike plate, or both a deadbolt strike plate and a door latch strike plate.

The main panel may further include an exhaust vent opposite the side configured to receive the exhaust hose.

Implementations of a detachable door system may include a main panel, an upper panel, and a connection mechanism by which an upper side of the main panel hingedly couples to the upper panel, and the main panel may be configured to couple with a door casing. The connection mechanism may include a hinge locking system capable of a fixed open position and a closed position. The hinge locking system may include a fixed bracket secured to the main panel, the fixed bracket hingedly coupled to a non-fixed bracket secured to the upper panel; a locking pin configured to engage in a pair of slots in the fixed bracket corresponding with the fixed open position and movable slidably into a pair of slots in the fixed bracket corresponding with the closed position; and a removable fastener configured to prevent the locking pin from moving slidably into the pair of slots corresponding with the closed position.

Implementations of a detachable door system may include one, all, or any of the following:

The removable fastener may be configured to couple the locking pin to the main panel and prevent the locking pin from moving slidably into the pair of slots corresponding to the closed position.

The system may include a second connection mechanism configured to allow a lower panel to hingedly couple to a lower side of the main panel where the connection including a second hinge locking system.

The main panel may attach to the door casing using a deadbolt coupling system coupled on a side of the main panel, the deadbolt coupling system including a deadbolt bar coupled to a mounting plate where the deadbolt bar may be configured to couple into a deadbolt strike plate opening of a door casing.

The main panel may include one or more windows therein, the one or more windows configured to be mechanically openable by a user.

The system may include a door stop coupled along a side of the main panel, the door stop including a deadbolt strike plate, a door latch strike plate, or both a deadbolt strike plate and a door latch strike plate.

The system may include a locking system including a toggle latch coupled along and to a side of the main panel and a hook, the hook having a first curved end and a second curved end, the first curved end of the hook coupled with a door knob of a door hung within the door casing and the second curved end of the hook coupled with a ring extending from the toggle latch.

A detachable door system may include a main panel including at least one opening configured to receive an exhaust hose, an upper panel, and a connection by which an upper side of the main panel hingedly couples to the upper panel, where the main panel may be configured to couple with a door casing. A deadbolt coupling system may be included coupled on a side of the main panel, the deadbolt coupling system including a deadbolt bar coupled to a mounting plate, the deadbolt bar configured to couple into a deadbolt strike plate opening of the door casing to secure the main panel thereto.

Implementations of a detachable door system may include one, all, or any of the following:

The system may include a connection mechanism hingedly coupling a lower panel to a lower side of the main panel.

The main panel may include one or more windows therein, the one or more windows configured to be mechanically openable by a user.

The system may include a door stop coupled on a side of the main panel opposing the side of the deadbolt coupling system, the door stop including a deadbolt strike plate, a door latch strike plate, or both a deadbolt strike plate and a door latch strike plate.

The main panel further may include an exhaust vent opposite the side configured to receive the exhaust hose.

The system may include a locking system including a toggle latch coupled along and to a side of the main panel and a hook, the hook having a first curved end and a second curved end, the first curved end of the hook coupled with a door knob of a door hung within the door casing and the second curved end of the hook coupled with a ring extending from the toggle latch.

Implementations of a detachable door system may include a main panel including at least one opening configured to receive an exhaust hose, an upper panel, and a connection mechanism hingedly coupling the main panel with the upper panel. The connection mechanism may include a hinge locking system configured to move to a fixed open position and to a closed position, the hinge locking system may include a fixed bracket secured to the main panel and hingedly coupled to a non-fixed bracket secured to the upper panel; a locking pin configured to engage with a pair of slots in the fixed bracket corresponding to the fixed open position and movable slidably into a pair of slots in the fixed bracket corresponding to the closed position; and a removable fastener configured to prevent the locking pin from moving slidably into the pair of slots corresponding to the closed position.

Implementations of a detachable door system may include one, all, or any of the following:

The removable fastener may be configured to couple the locking pin to the main panel to prevent the locking pin from moving slidably into the pair of slots corresponding to the closed position.

The system may include a second connection mechanism hingedly coupling a lower panel to a lower side of the main panel, the connection mechanism including a second hinge locking system.

The main panel may be configured to couple with the door casing using a deadbolt coupling system coupled on a side of the main panel, the deadbolt coupling system including a deadbolt bar coupled to a mounting plate, the deadbolt bar configured to couple into a deadbolt strike plate opening of a door casing.

The main panel may include one or more windows therein, the one or more windows configured to be mechanically openable by a user.

The system may include a door stop coupled along a side of the main panel, the door stop including a deadbolt strike plate, a door latch strike plate, or both a deadbolt strike plate and a door latch strike plate.

The main panel further may include an exhaust vent opposite the side configured to receive the exhaust hose.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 9 is a front view of an implementation of a pet door system folder with the upper and lower panels folded in;

DESCRIPTION

This disclosure, its aspects and implementations, are not limited to the specific components, assembly procedures or method elements disclosed herein. Many additional components, assembly procedures and/or method elements known in the art consistent with the intended pet door systems will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such pet door systems, and implementing components and methods, consistent with the intended operation and methods.

Figure 1:
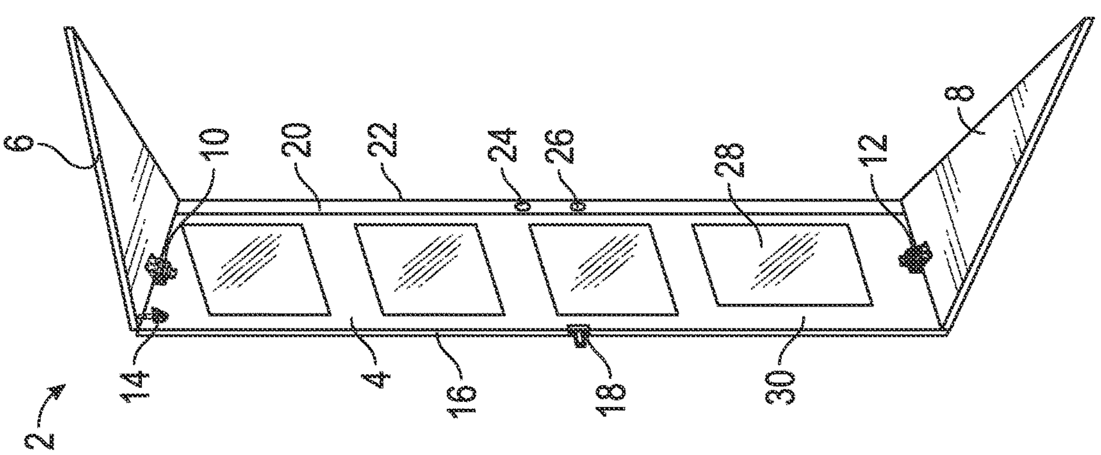
FIG. 1 is a front perspective view of an implementation of a pet door system.

Referring to FIG. 1, an implementation of a pet door system 2 is illustrated. Implementations of pet door systems like those disclosed in this document are designed to fit between a swinging door and a door casing in which the door is installed thereby allowing a pet door opening to be included. The system 2 includes a main panel 4 to which an upper panel 6 and lower panel 8 are hingedly coupled. In various implementations, hinges 10, 12 are used to hingedly couple the upper panel 6 and lower panel 8 with the main panel 4. As will be described hereafter, these hinges 10, 12 may be locking hinges in various implementations. Additional support for the upper panel 6 to keep it in an extended position away from the main panel 4 may be provided by a latch 14 which biases the upper panel 6 away from the main panel 4 until the latch 14 is released. In various implementations, as will be described hereafter, the latch 14 may be a toggle latch.

Along a first side 16 of the main panel 4 a deadbolt coupling system 18 is coupled. The deadbolt coupling system 18 is positioned along the main panel 4 so that a deadbolt bar of the system 18 can be inserted into a deadbolt strike plate mounted to the door casing. Generally, since the main panel 4 may be oriented substantially perpendicularly to a plane formed by the door casing itself, the deadbolt bar will corresponding be oriented substantially perpendicularly to a plane formed by the main panel 4. In other implementations, however, where the main panel 4 is designed to be coupled at an angle other than perpendicular to the plane of the door casing, the deadbolt bar will be oriented at a corresponding angle to the plane of the main panel 4. Because the deadbolt coupling system 18 is designed to couple with the deadbolt strike plate of the door casing, the main panel 4 can be coupled to the door casing at that location.

Along a second side 20 of the main panel 4 a door stop 22 is coupled. The door stop 22 illustrated in FIG. 1 includes a deadbolt strike plate 24 (and corresponding opening in the door stop to receive a deadbolt bar) and a door latch strike plate 26 (and a corresponding opening in the door stop 22 to receive the latch). In various implementations, however, the door stop 22 may include only a deadbolt strike plate 24 or a door latch strike plate 26. The deadbolt strike plate 24 and the door latch strike plate 26 allow a deadbolt and/or a door latch of a door hung in the door casing to be coupled to the door stop 22. In this way, the main panel 4 of the door is coupled to the door, between the door and the door casing. In other implementations, however, the door stop may not be used, and the strike plates may be included in the main panel 4 itself.

A pet door 28 is included in the main panel 4, sized and positioned to allow an animal to pass through the pet door 28. Any of a wide variety of pet doors 28 may be utilized in various implementations. Some of these may include a hinged flap/entry flap 30 that allows the animal to pass into and out of the pet door 28. An example of such a door that could be used in various implementations is that disclosed in the ’645 Patent previously incorporated by reference.

Figure 2:
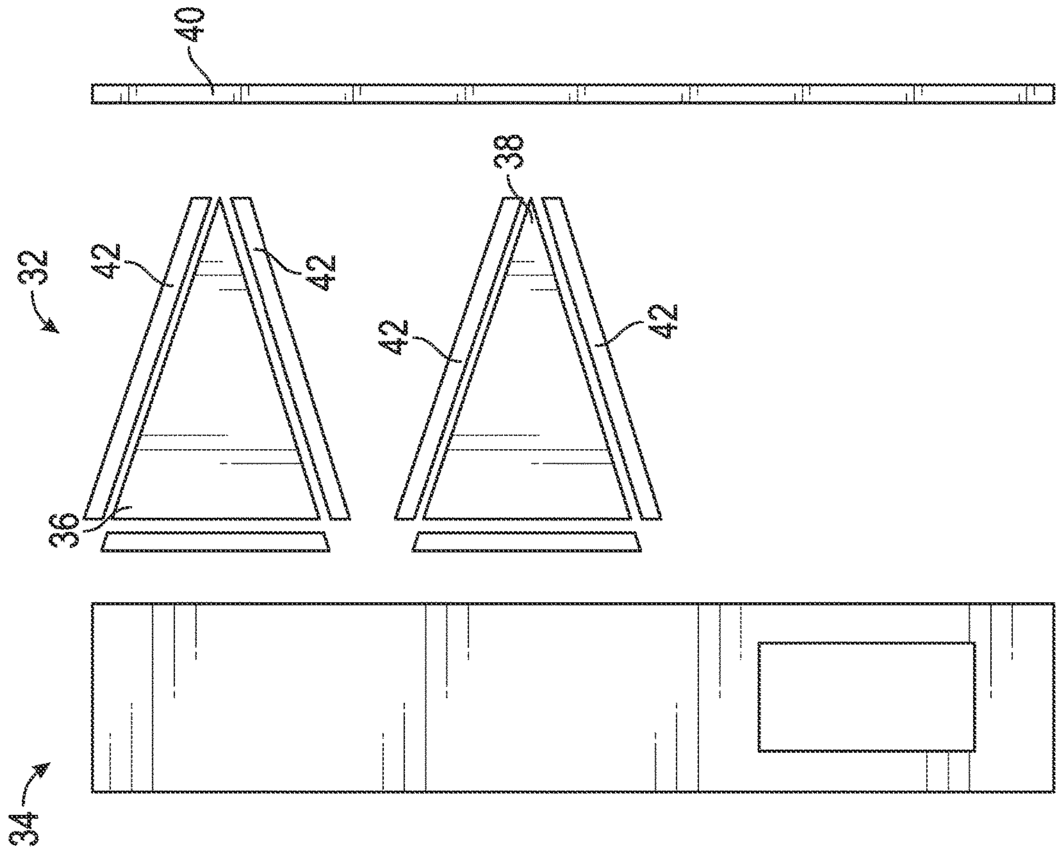
FIG. 2 is an exploded view of various components of an implementation of a pet door system.

Referring to FIG. 2, an exploded view of several components of an implementation of a pet door system 32 is illustrated. This view shows the outline of the main panel 34 and also shows how the upper panel 36 and lower panel 38 are triangularly shaped to fill in the space above and below the opening created by the door and main panel 34. The shape of the door stop 40 is also illustrated. Weather stripping 42 is included along the surfaces of the upper panel 36 and lower panel 38 where the panels meet the main panel 34 and meet the door and door casing to limit airflow, conserve energy, and/or prevent insects from entering at these locations.

Figure 3:
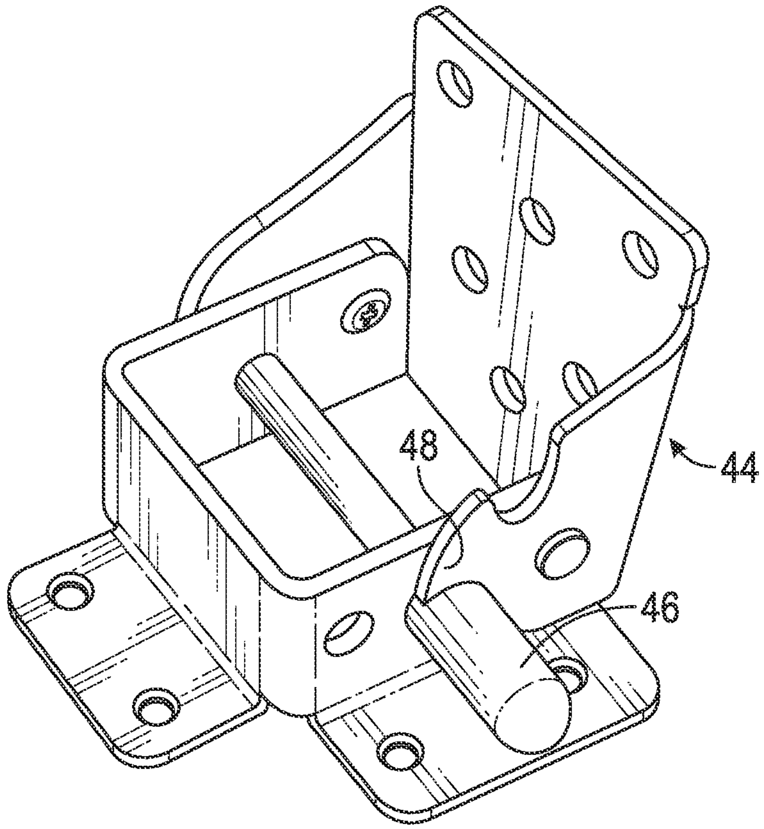
FIG. 3 is a perspective view of an implementation of a locking hinge.

Referring to FIG. 3, an implementation of a locking hinge 44 is illustrated. As illustrated, the locking hinge contains a locking pin 46 with a larger diameter on one end that is designed to engage a locking structure 48 on the hinge and prevent the locking structure 48 from moving across the pin 46. In this way, the locking hinge 44 is designed to keep the hinge in a fixed position while the locking pin 46 is engaged. This feature of the locking hinge 44 allows the upper panel and lower panel to be locked into a desired hinged relationship with the main panel when the pet door system is installed in a door opening.

Figure 4:
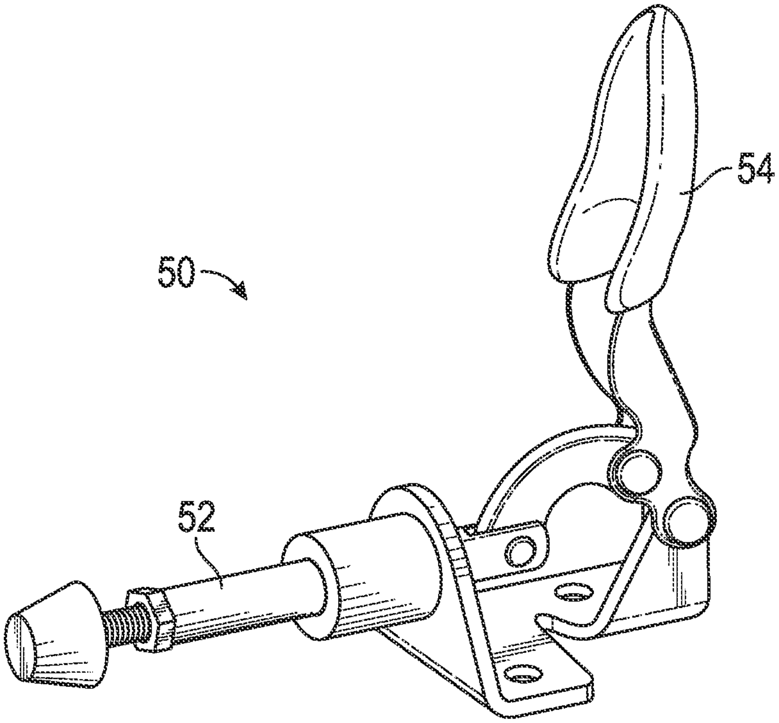
FIG. 4 is a perspective view of an implementation of a toggle latch.

Referring to FIG. 4, an implementation of a toggle latch 50 is illustrated. The toggle latch 50 includes a push rod 52 which is designed to move outwardly in response to movement of toggle 54. The push rod 52 is mechanically designed to remain in place against bias force applied against the rod until the toggle 54 is released. In this way, the toggle latch 50 can be used as a second support against the weight of the upper panel to prevent the upper panel from folding downwardly until both the locking hinge and toggle latch are released. This may improve the safety of the overall system.

Figure 5:
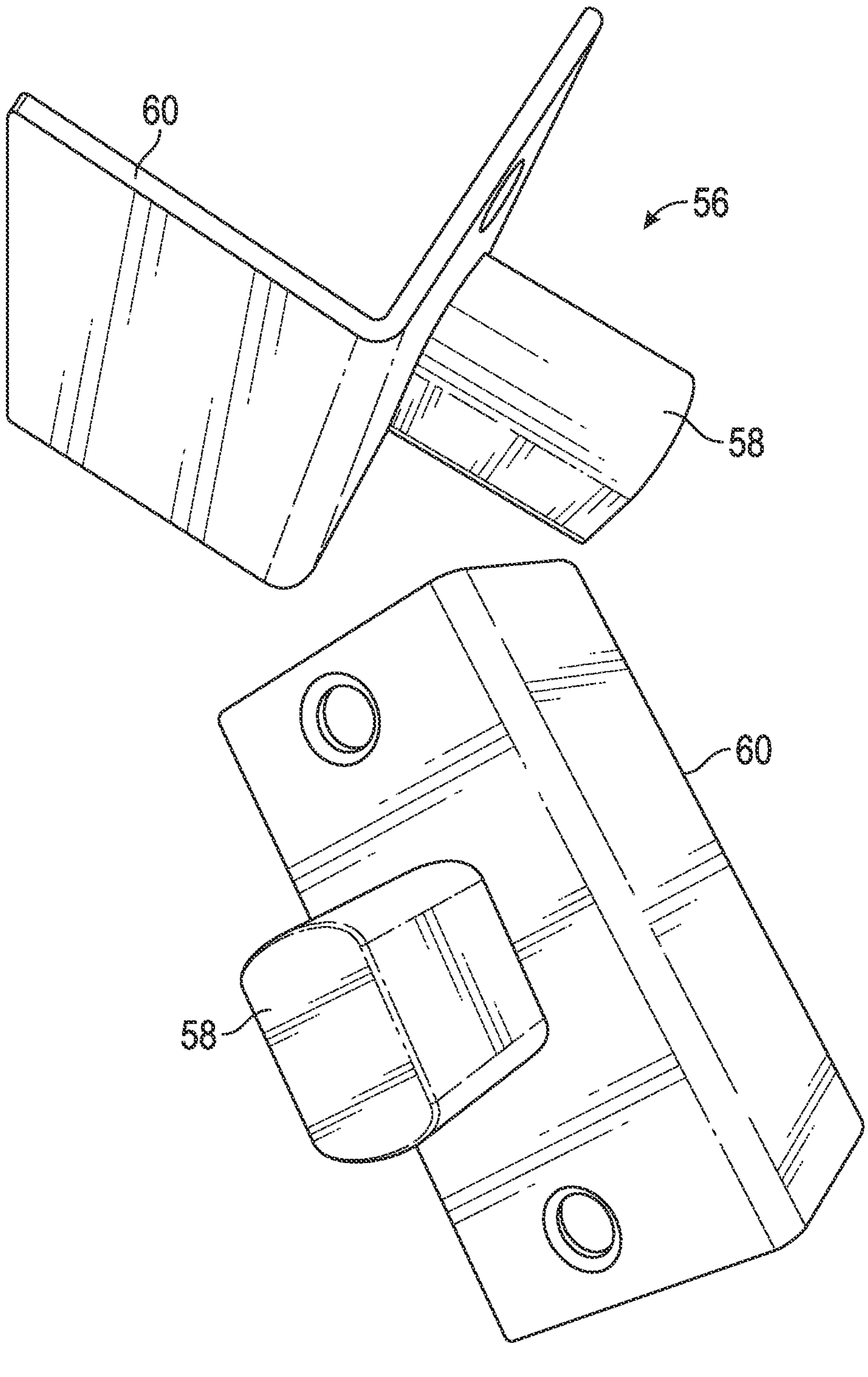
FIG. 5 are two perspective views of a deadbolt coupling system.

Referring to FIG. 5, two views of an implementation of a deadbolt coupling system 56 are illustrated. As can be seen, the system 56 includes a deadbolt bar 58 coupled to a mounting plate 60. The deadbolt bar 58 in this implementation may be, by non-limiting example, fixedly coupled to the mounting plate 60 through a fastener such as a screw, bolt, etc.; be fixedly coupled through welding or soldering; or may be integrally formed with the mounting plate through casting or molding. The mounting plate 60 is designed to fasten to the main panel along an edge of the main panel. Because the mounting plate is designed to fasten around the edge, the deadbolt bar 58 can be oriented substantially perpendicularly to the main panel and located so it fits into the deadbolt strike plate of the door casing. In this way, the deadbolt coupling system 56 allows the main panel to couple to the door casing through the deadbolt bar 58. The deadbolt bar 58 and mounting plate 60 may be formed of various materials including metals and composites and may be sized as appropriate to assist with preventing cutting of the deadbolt bar 58. In various implementations, the deadbolt bar may include an additional bar internally that rotates when contacted by a saw attempting to cut through the deadbolt bar, thereby preventing the deadbolt bar from being sawn through.

Figure 6:
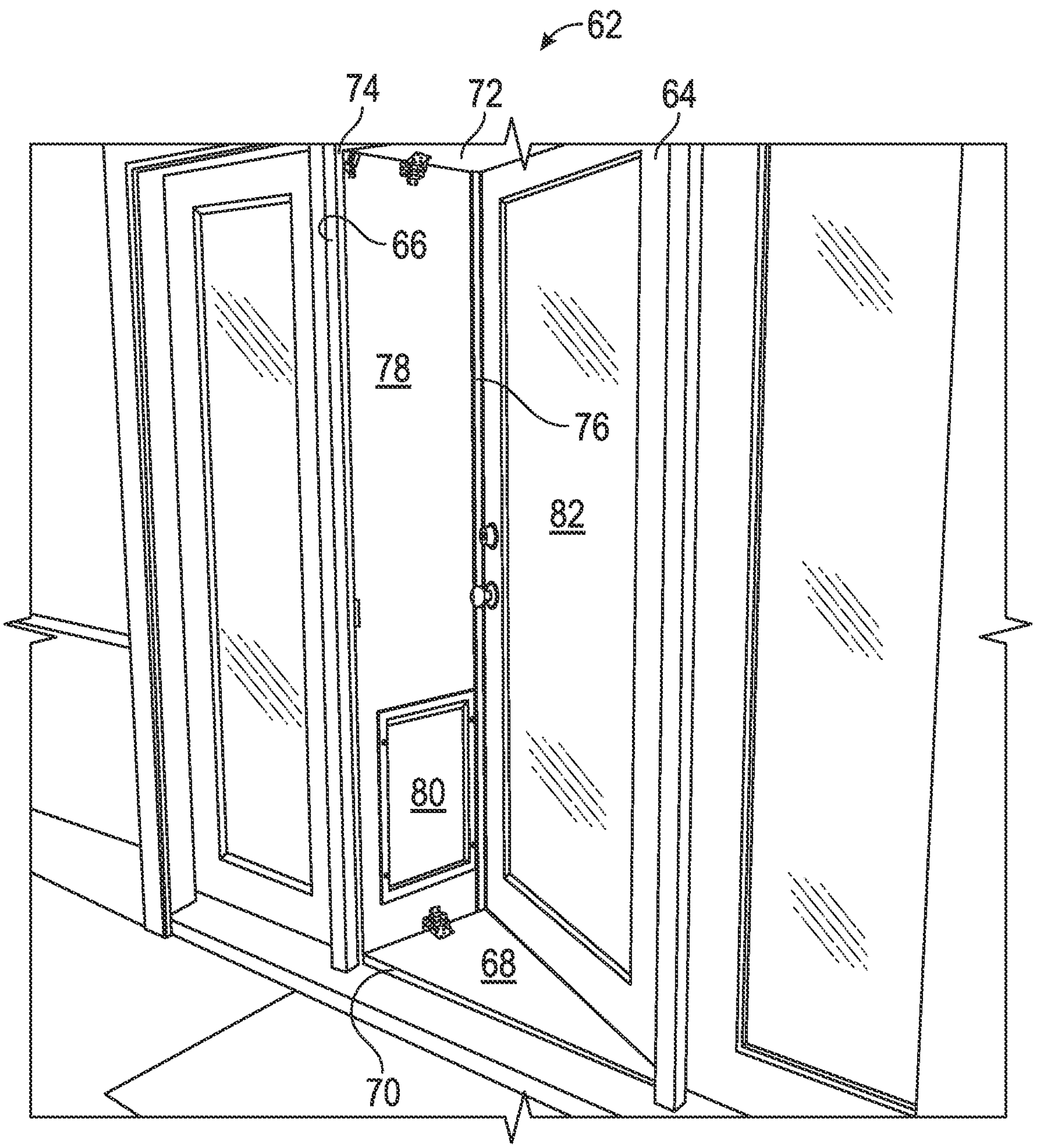
FIG. 6 is a front perspective view of an implementation of a pet door system installed in an inswing patio door.

Referring to FIG. 6, a front view of an implementation of a pet door system 62 is illustrated installed in an opening created by an inswing door 64 and a door casing 66. As illustrated, the lower panel 68 fills in the space between the door 64 and the door sill 70 and the upper panel 72 fills in the space between the door 64 and the upper edge 74 of the casing. The deadbolt and door latch of the door 64 are engaged with the corresponding strike plates in the door stop 76, and the main panel 78 is coupled with the door casing at the deadbolt strike plate of the door casing. The pet door 80 of the main panel 78 now allows an animal, such as a dog or cat, to enter freely through the pet door 80. While the door 64 illustrated in FIG. 6 is an inswing door, system implementations may be created that can be used with outswing doors using the principles disclosed herein. Also the systems illustrated herein may be able to be used without modification for both left hung and right hung doors. The door 64 includes a single glass pane 82, which prevents the cutting of an opening for fitting a conventional pet door therein. Because of this, pet door systems disclosed herein can be used with door types that traditionally cannot be modified to include pet doors, such as glass pane and French doors.

Figure 7:
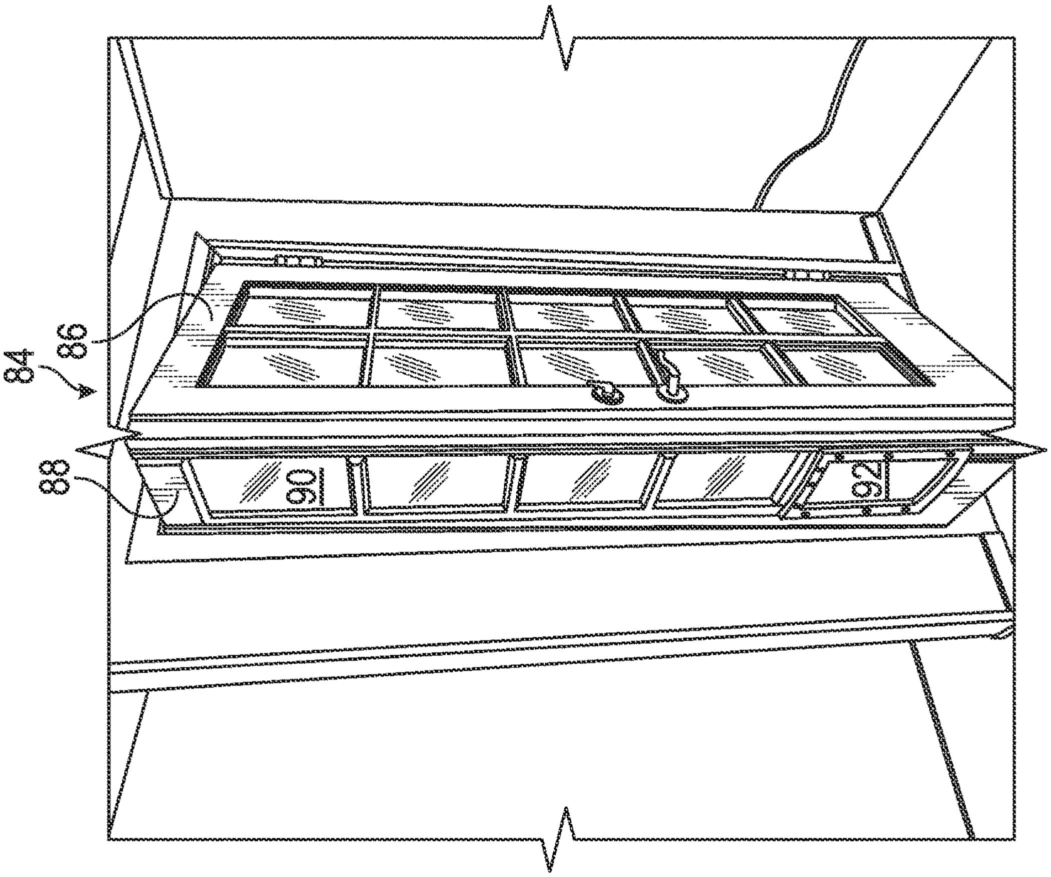
FIG. 7 is a rear perspective view of another implementation of a pet door system installed in an inswing French door.

Referring to FIG. 7, a back view of an implementation of a pet door system 84 installed in an opening with a French inswing door 86 is illustrated. As illustrated, the main panel 88 includes glass window panes 90 that correspond in size with those of the French door 86. In various implementations, the finish of the main panel 88 can be done to correspond with the finish of the French door as well, to make them appear as though they are a single unit. In this way, a pet door 92 can be created in a doorway that includes a French door, which otherwise would have been impossible to have been modified in order to fit a conventional pet door.

Figure 8:
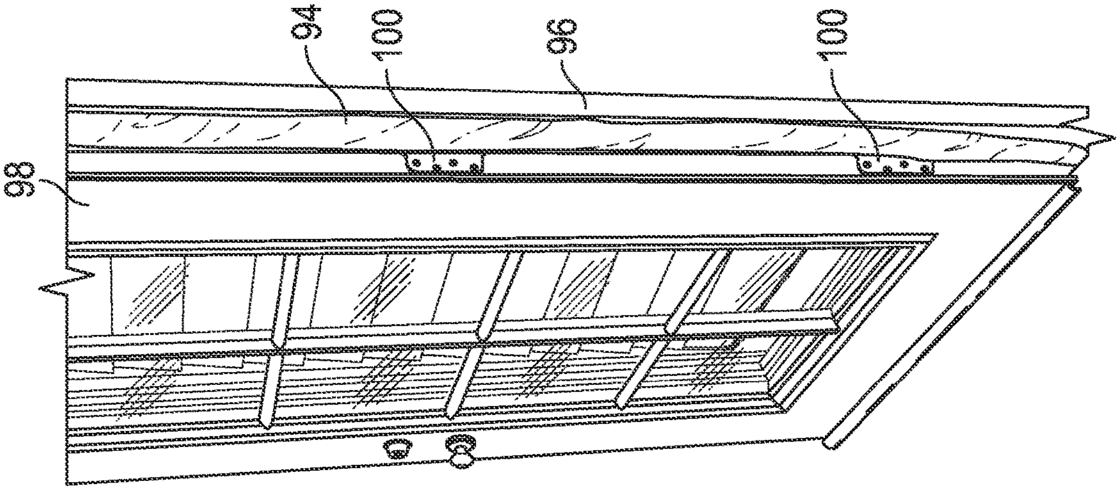
FIG. 8 is a front perspective view of an implementation of a door sock installed along the hinges of an inswing French door.

Referring to FIG. 8, an implementation of a door sock 94 is illustrated, positioned in the opening between the door casing 96 and the door 98 created by the door hinges 100 as the door 98 is swung open. The door sock 94 is designed to fill the space of the opening, and block light and air from passing through the opening. This may improve the energy efficiency and/or prevent insects from entering through opening while the pet door system installed in the door. The door sock 94 may include a flexible material within a casing material, such as, by non-limiting example, a fabric batting, fiberglass insulation, open or closed cell foam, or any other flexible material capable of being compressed. The casing may be waterproofed or otherwise UV resistant to prevent the door sock from breaking down as a result of exposure to the elements.

Figure 9:
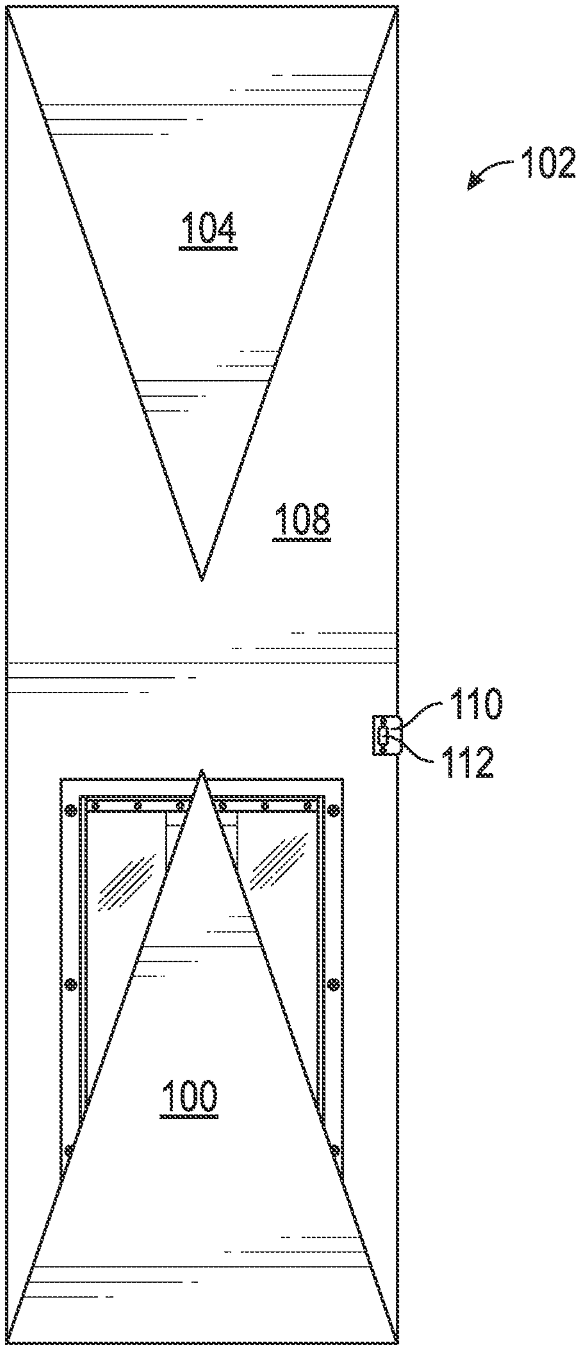
Figure 10:
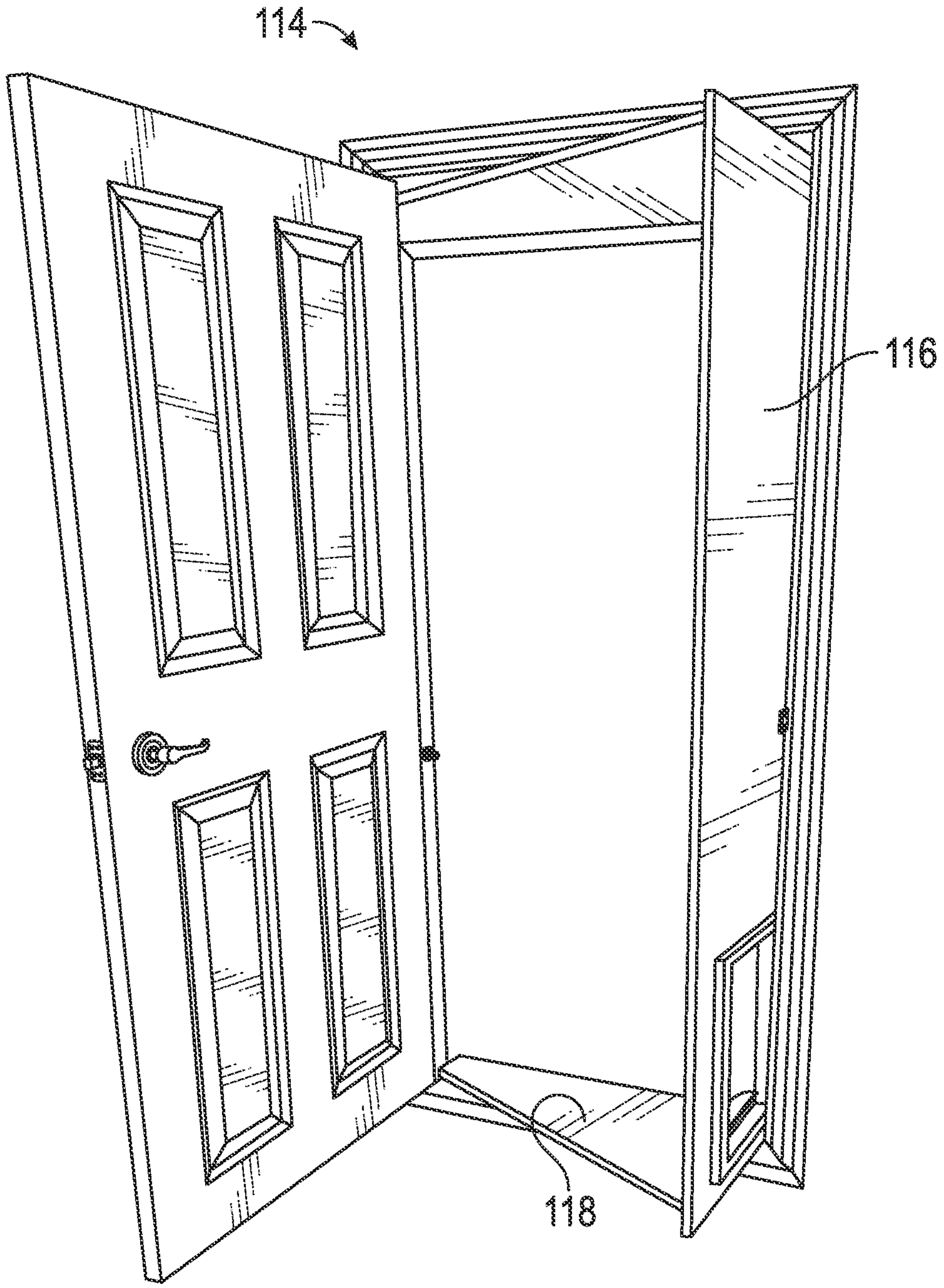
FIG. 10 is a rear perspective view of an implementation of a pet door system with an inswing door opened and not coupled at the strike plate of the main panel.

Referring to FIG. 9, a front view of an implementation of a pet door system 102 is illustrated in a folded position. In this position, the upper panel 104 and lower panel 106 are folded down and up, respectively against the main panel 108. The door latch strike plate 110 is visible with the latch opening therein 112 facing directly out of the paper. In the folded position, the system 102 may be stored more easily against a wall, in a garage, etc. when the pet door is not needed. Implementations of pet door systems like those disclosed herein are generally designed to be temporarily installed in to door openings. However, users could choose to place system implementations semi-permanently or permanently in the door openings, since the doors are still usable (openable and closable) while the pet door system is installed in the door opening. FIG. 10 illustrates this, showing a back view of an implementation of a pet door system 114 with the door opened and disengaged from the strike plate(s) of the door stop/main panel 116. As can be seen, it is possible for a user to still enter and exit through the door even when the pet door system 114 is installed, by stepping over the lower panel 118.

The materials from which implementations of main panels, top panels, bottom panels, and pet doors may be made may include, by non-limiting example, wood, metal, fiberglass, composite materials, plastics, rubbers and the like. Those of ordinary skill in the art will readily be able to select appropriate materials for these components using the principles disclosed herein.

Figure 11:
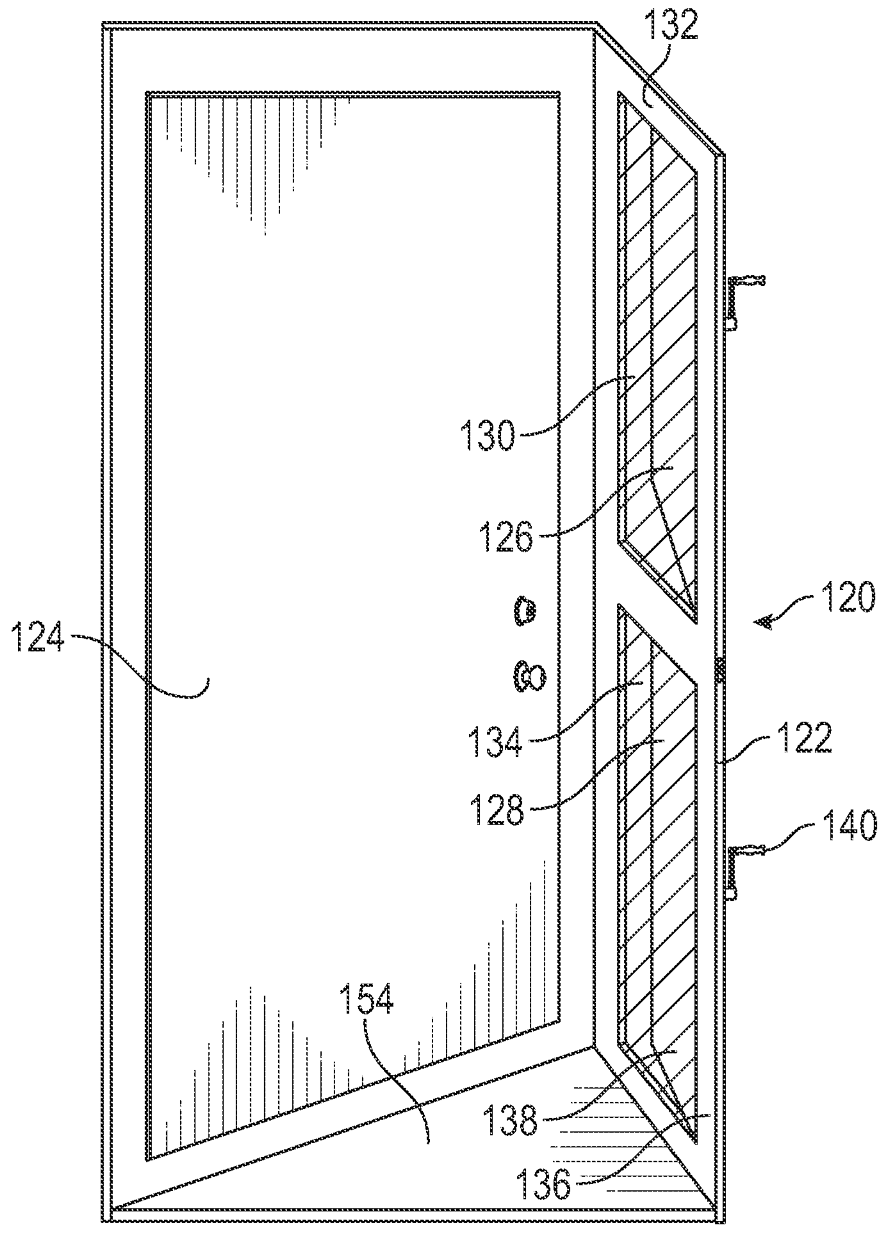
FIG. 11 is a front perspective view of an implementation of a detachable window system with an outward swing door opened.

Referring to FIG. 11, an implementation of a detachable window system 120 is illustrated. The implementation of the detachable window system 120 is coupled with the door casing 122 of an outward swinging door 124. Referring to FIG. 11, the implementation of a detachable window system 120 includes two windows 126 and 128. There is an openable window 126 in the top portion 130 of the main panel 132 and an openable window 128 in the bottom portion 134 of the main panel. Each of the two openable windows 126 and 128 illustrated includes a window casing 136, a screen 138 within the window casing 136, and a window opening mechanism 140. In some implementations, the window opening mechanism may be a crank. In other implementations, the window opening mechanisms may include levers, tracks, and other mechanisms for opening the windows.

As illustrated in FIG. 11, the windows open out at an angle from the detachable window system. In other implementations, the one or more openable windows may include one or more sashes that slide to open and do not require more space to open the window. In some implementations, the panes in the openable windows may be glass and in other implementations, the panes may be formed of other transparent/translucent material such as, by non-limiting example, plastic.

Figure 12:
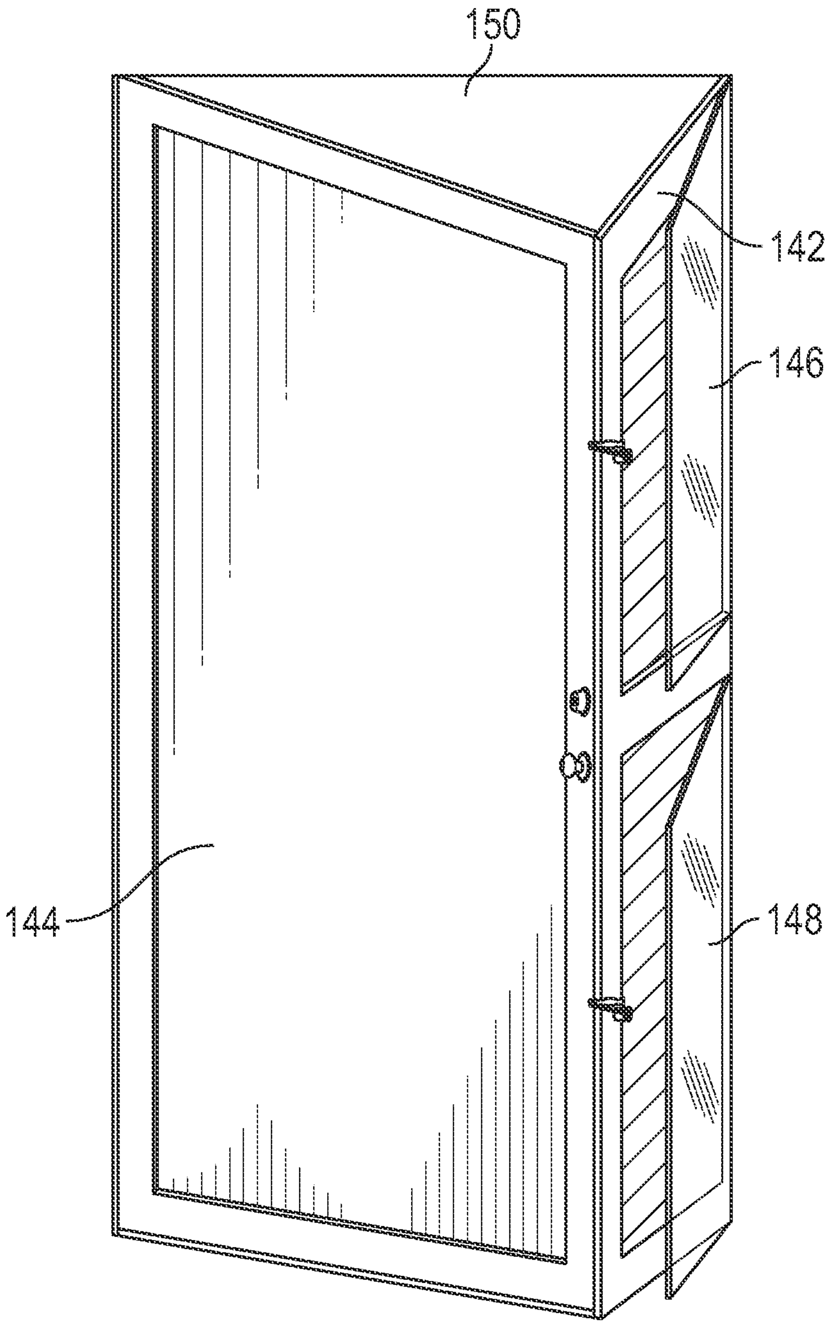
FIG. 12 is a front perspective view of an implementation of a detachable window system with an inswing door opened.
Figure 13:
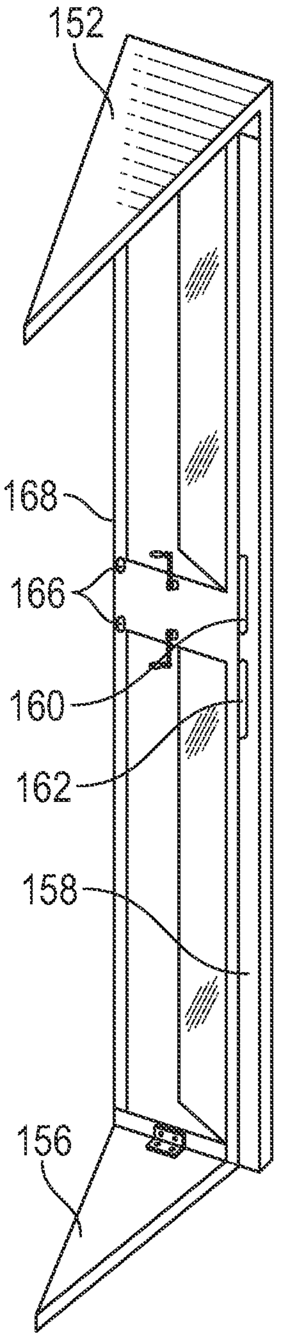
FIG. 13 is an side perspective view of an implementation of a detachable window system.

Referring to FIG. 12, the detachable window system 142 may be coupled to an inward swing door 144 as illustrated in FIG. 12. The detachable window system 142 includes a main panel having two openable windows 146 and 148. In various implementations, there may be only one openable window and the one openable window may take up only a portion of the main panel. The detachable window system 142 also includes an upper panel 150 and 152 hingedly coupled to an upper side of the panel as illustrated in FIG. 12 and FIG. 13, respectively. The detachable window system also includes a lower panel 154 and 156 hingedly coupled to a lower side of the main panel opposing the upper side as illustrated in FIGS. 11 and 13, respectively. The upper panel and lower panels may help to seal the opening caused by a door being in an opened position. The upper panel and the lower panel may fold onto the main panel for storage.

Figure 14:
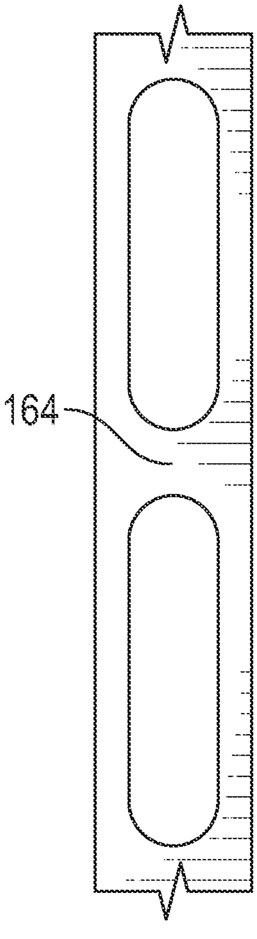
FIG. 14 is an enlarged view of an implementation of a strike plate in an implementation of a detachable window system as shown in FIG. 13.

Referring to FIG. 13, implementations of a detachable window also include a door stop 158 coupled along a side of the main panel. The door stop 158 includes a deadbolt strike plate and a door latch strike plate. An enlarged view of a combination 164 deadbolt strike plate 160 and a door latch strike plate 162 is illustrated in FIG. 14. In various implementations, the door stop may have only a deadbolt strike plate or only a door latch strike plate depending on the door casing of the original door. The original door may be a standard front or rear entry door in various implementations. Implementations of a detachable window system may be used in houses, apartments, dorm rooms, and other situations where a user may not be able to add a permanent window and/or screen door to their dwelling (particularly where the user is a renter of the property). The ability of implementations of a detachable window to be used on an inswing door may allow users to install the system without the system protruding into a hallway of an apartment building or dormitory/residence hall. In other implementations, the original door may be coupled to French doors at the back of a dwelling as previously described in this document.

Figure 15:
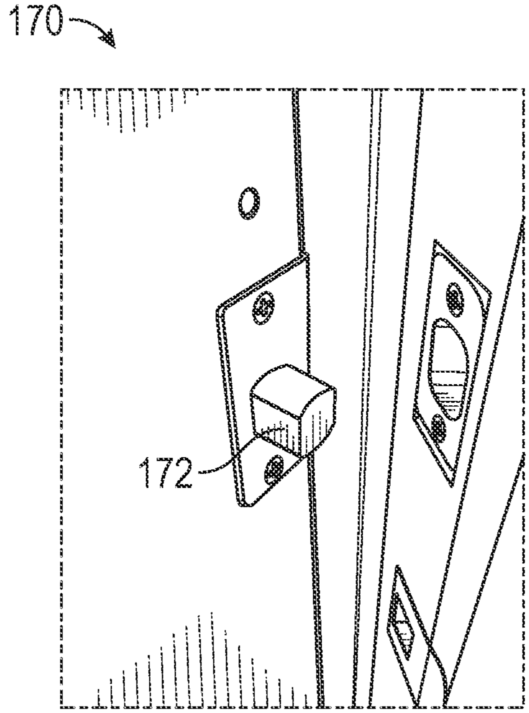
FIG. 15 is an enlarged view of an implementation of a deadbolt coupling system on an implementation of a detachable window system.

Referring again to FIG. 13, implementations of a detachable window system also include deadbolt coupling system 166 on a side 162 of the main panel opposing the side of the main panel to which the door stop 158 is coupled. An enlarged view of the deadbolt coupling system 170 is illustrated in FIG. 15. The deadbolt coupling system 170 includes a deadbolt bar 172 coupled to a mounting plate. The deadbolt coupling system allows the detachable window system to fully engage with the door and casing where it is installed.

Figure 16:
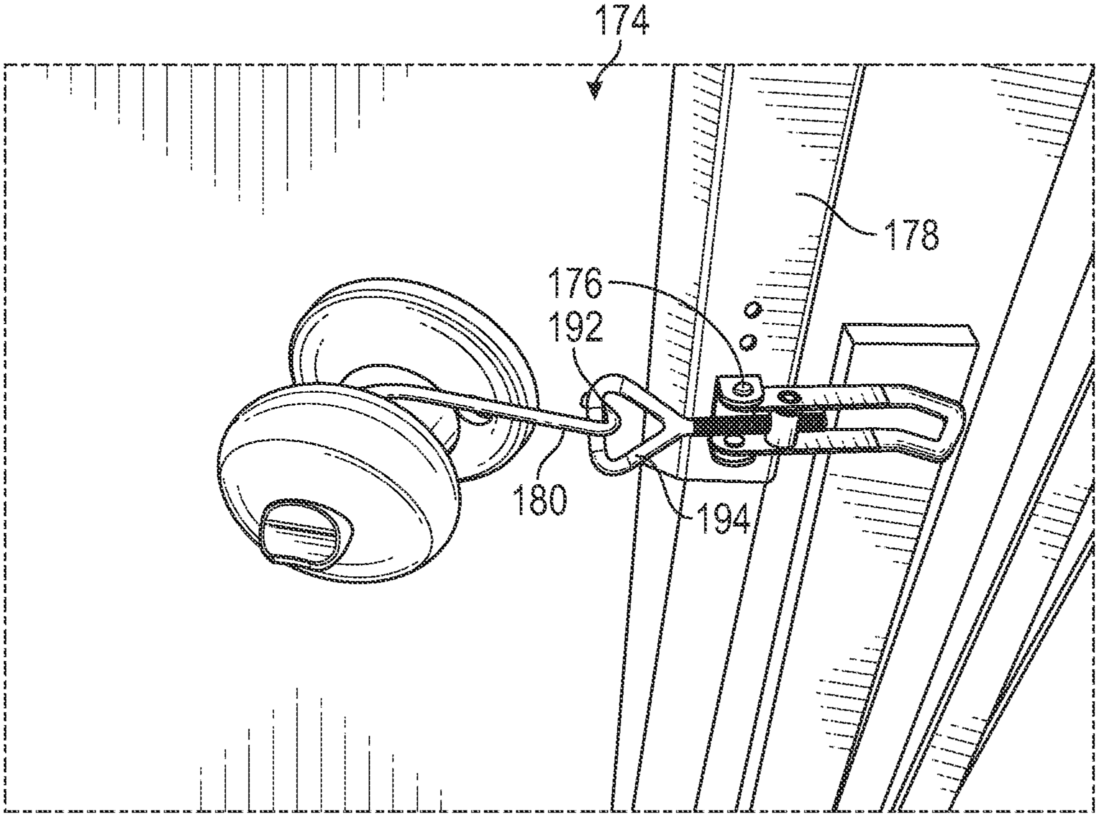
FIG. 16 is a front perspective view of an implementation of a locking system in a locked position.
Figure 17:
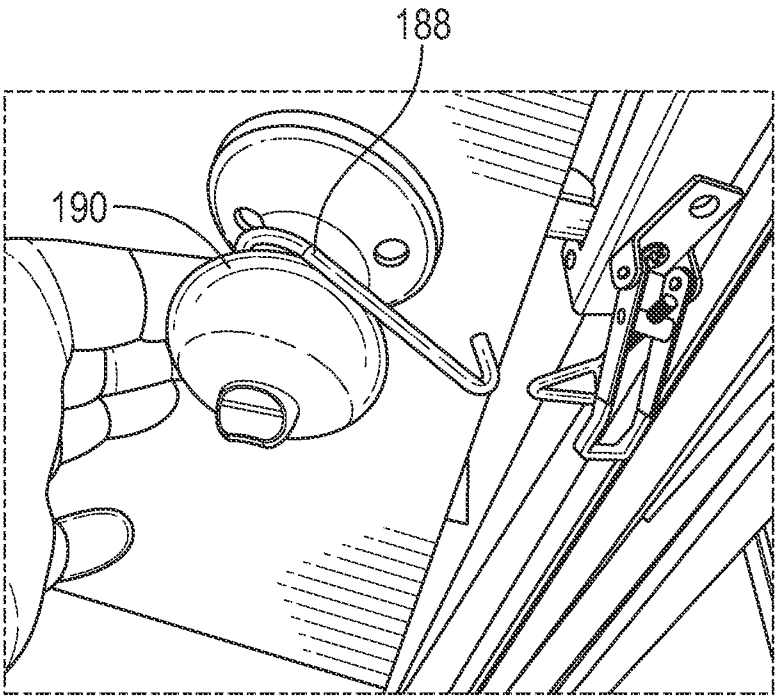
FIG. 17 is a top perspective view of an implementation of a locking system in an unlocked position.
Figure 18:
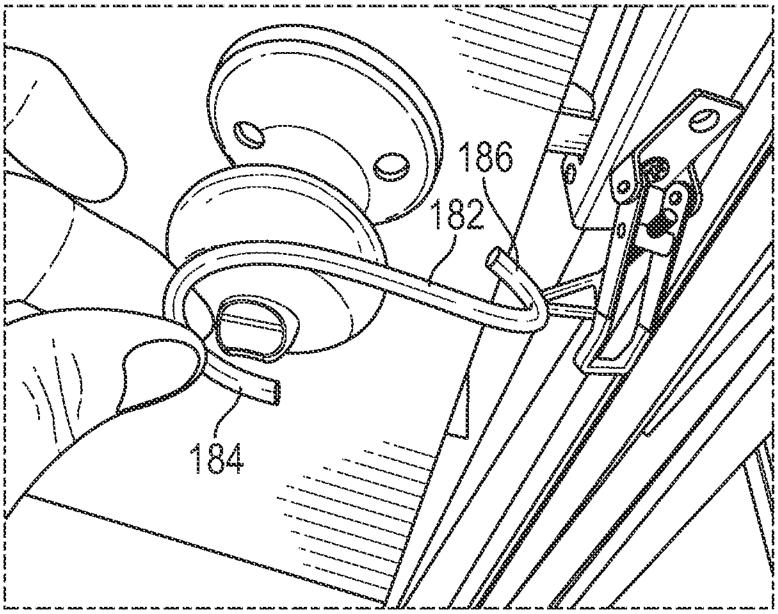
FIG. 18 is a top perspective view of an implementation of a hook from an implementation of a locking system.

Referring to FIG. 16, an implementation of a locking system 174 for an implementation is illustrated. The locking system 174 includes a toggle latch 176 coupled along a side of a main panel 178 of a detachable window system. In various implementations a locking system may be used with a standard door to provide extra security to a user. The locking system also includes a hook 180. As illustrated in FIG. 18, an implementation of a hook 182 used in a locking system has a first end 184 and a second end 186. The first end 184 of the hook and the second end 186 of the hook may have similar sizes or one end of the hook may be larger than the other end of the hook. By non-limiting example, the first end of the hook may be larger than the second end of the hook or the second end of the hook may be larger than the first end of the hook. In various implementations, the first end of the hook 188 may be large enough to fit around the smallest end of a door knob coupled to a door as illustrated in FIG. 17. Referring again to FIG. 16, the second end 192 of the hook 180 may couple with a ring 194 extending from the toggle latch 176. The toggle latch may be placed in a closed position to put tension on the hook when the latch is closed/rotated thereby locking the door and detachable window system from the inside and preventing the door from being opened.

Figure 19:
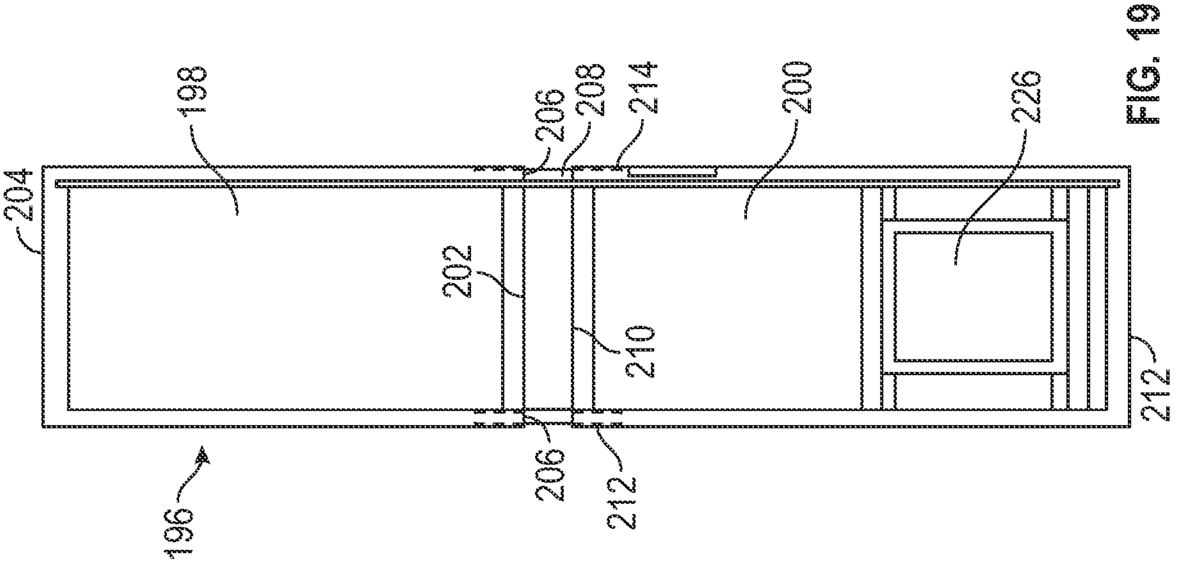
FIG. 19 is a schematic of an implementation of a detachable door system.

Referring to FIGS. 19-26, an implementation of a detachable, collapsible, and expandable door system is illustrated. Implementations of detachable and collapsible door systems may be made of any materials previously described in this application, such as by non-limiting example, aluminum, vinyl, and other lightweight and durable materials. Referring to FIG. 19, a schematic of an implementation of a detachable door 196 is illustrated. The door 196 includes a first panel 198 and a second panel 200. The first panel 198 includes a first end 202 and a second end 204. On the second end 204 of the first panel 198, there are two openings 206 configured to receive two poles 208 from the second panel 200. The second panel 200 also has a first end 210 and a second end 212. Two poles 208 extend from the first end 210 of the second panel 200. The two poles are positioned opposite each other on an outer edge 212 and 214 of the first end 210 of the second panel 200. In other implementations, the poles may be slide attachments. Both the poles and slide attachments allow the door system to be taken apart for compact storage and shipping. The first panel and the second panel can be detached/decoupled and stacked. Various implementations of detachable door systems may be coupled with a door of a building as described above. The slide attachments also allow the door system to extend to a height of eighty inches to couple with larger doors. In various implementations, the detachable door system may be between 77 inches to 96 inches. In other implementations, the detachable door system may be sized to fit any standard door.

Figure 27:
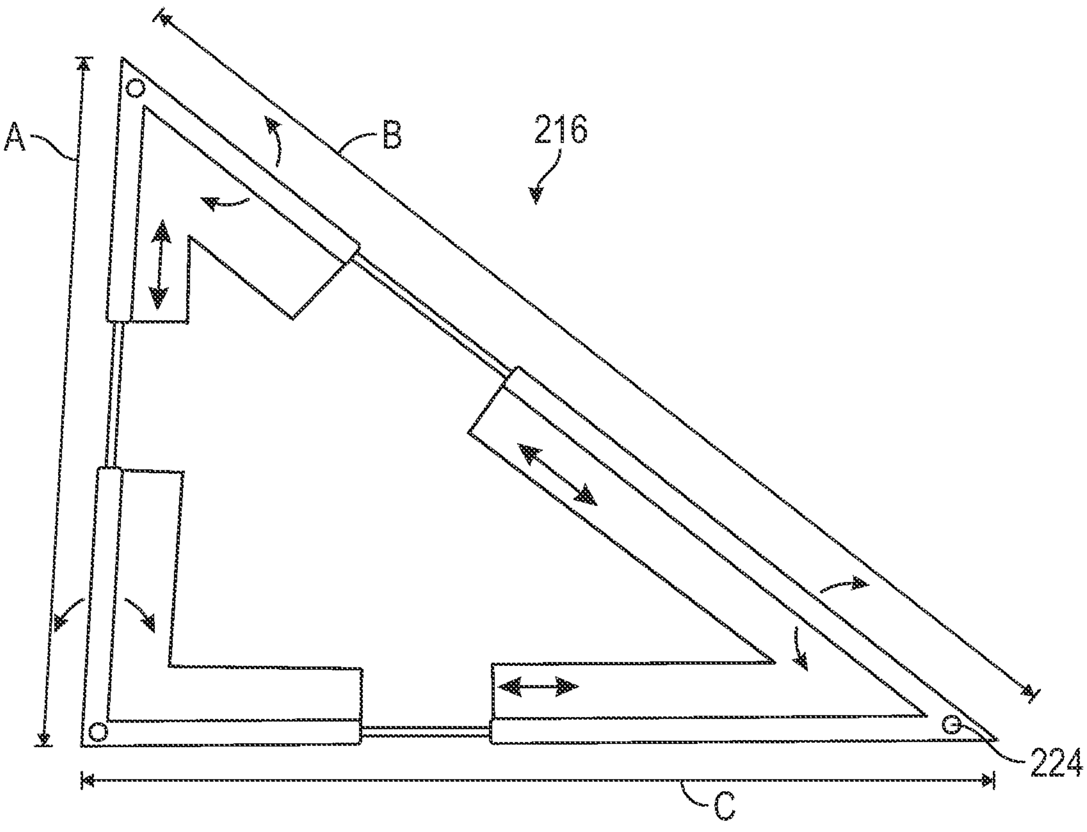
FIG. 27 is a front view of an implementation of an extendable triangular panel.
Figure 27A:
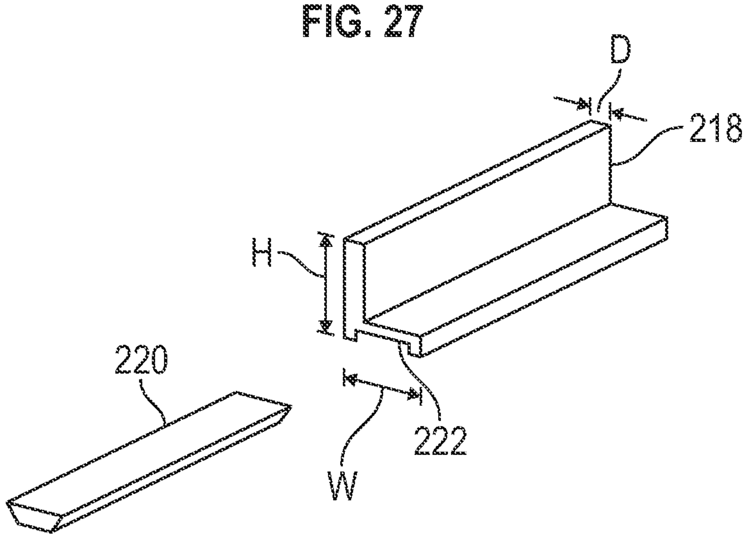
FIG. 27A is a perspective view of an implementation of a bracket and a slide as illustrated in FIG. 27.

Implementations of detachable door systems may include a first triangular panel coupled to the first end of the first panel and a second triangular panel coupled to the second end of the second panel. In various implementations, the triangular panels 216 may be extendable as illustrated in FIG. 27. Side A of the triangular panel may extend between a length of 12 inches to 15 inches, side B may extend between a length of 32 inches and 36 inches, and side C may extend between a length of 32 inches and 36 inches. The sides each extend through a sliding mechanism. Each angle of the triangular panel is formed by two brackets. An exploded view of the slide mechanism including a bracket 218 and a slide 220 is illustrated in FIG. 27A. The bracket includes an indentation or slot 222 configured to receive the slide 220. In various implementations, the bracket may have a height H of 1 inch, a length L of 1 inch, and a depth of D of one eighth (⅛) inch. In various implementations, the triangle may be formed of aluminum. In other implementations, the triangle may be formed of other light weight and durable materials. The triangular panels may be right triangles as illustrated in FIG. 27. The corners of the triangle may include pins 224 to act as stops and/or to hold the brackets together. In some implementations of detachable door systems the triangular panels may be formed of 1 inch thick insulation board such as by non-limiting example, polyisocyanurate.

Figure 20:
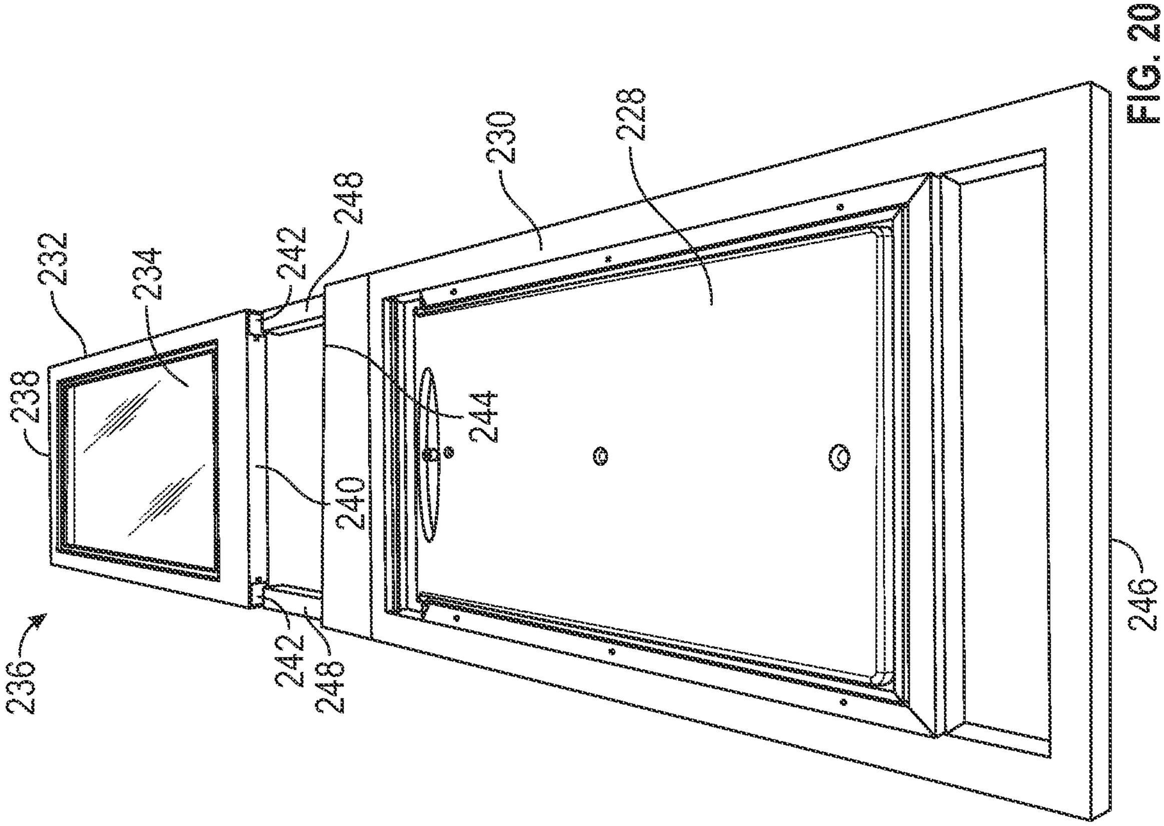
FIG. 20 is a front perspective view of an implementation of a detachable door system in a detached position.

Referring again to FIG. 19, implementations of a detachable door 196 may include a pet door 226 in the second panel 200. In some the implementations, the pet door may be small and only take up a portion of the second panel as illustrated in FIG. 19. In other implementations, the pet door 228 may be large and take up most of the second panel 230 as illustrated in FIG. 20. In still other implementations, the pet door may have a size between the small door 226 and the large door 228. In some implementations, the first panel 232 of the detachable door may include a window 234. In other implementations, the second panel may include a window. In various implementations, the first panel and the second panel may both include a window. In still other implementations, the windows in the first panel and the second panel may include screens allowing the windows to be opened and provide cross ventilation in a room.

Referring to FIG. 20, an implementation of a detachable door 236 is illustrated. The detachable door 236 includes a first panel 232 having a first end 238 and a second end 240. The second end 238 of the first panel includes two openings 242 each on an outer edge of the first panel. The detachable door 236 also includes a second panel 230 having a first end 244 and a second end 246. The first end 244 of the second panel 230 includes two poles 248 positioned opposite each other on outer edges of the first end 244. In this view, the detachable door is in an uncoupled position where the two poles 248 of the second panel 230 are not coupled within the two openings 242 of the first panel 232.

Figure 22:
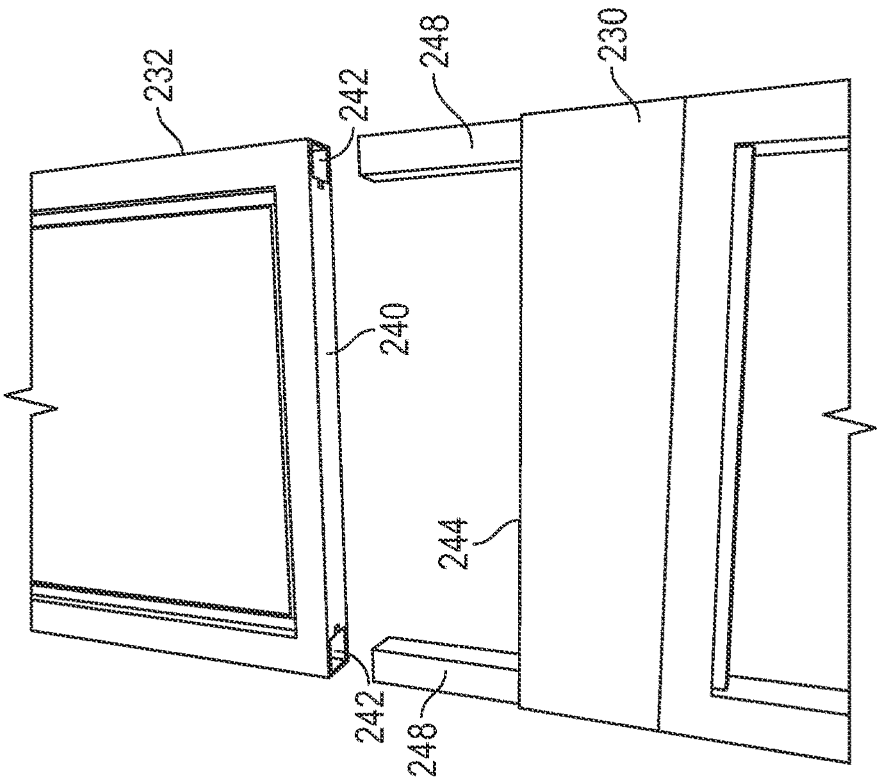
FIG. 22 is another close up view of an implementation of two poles of a detachable door.
Figure 21:
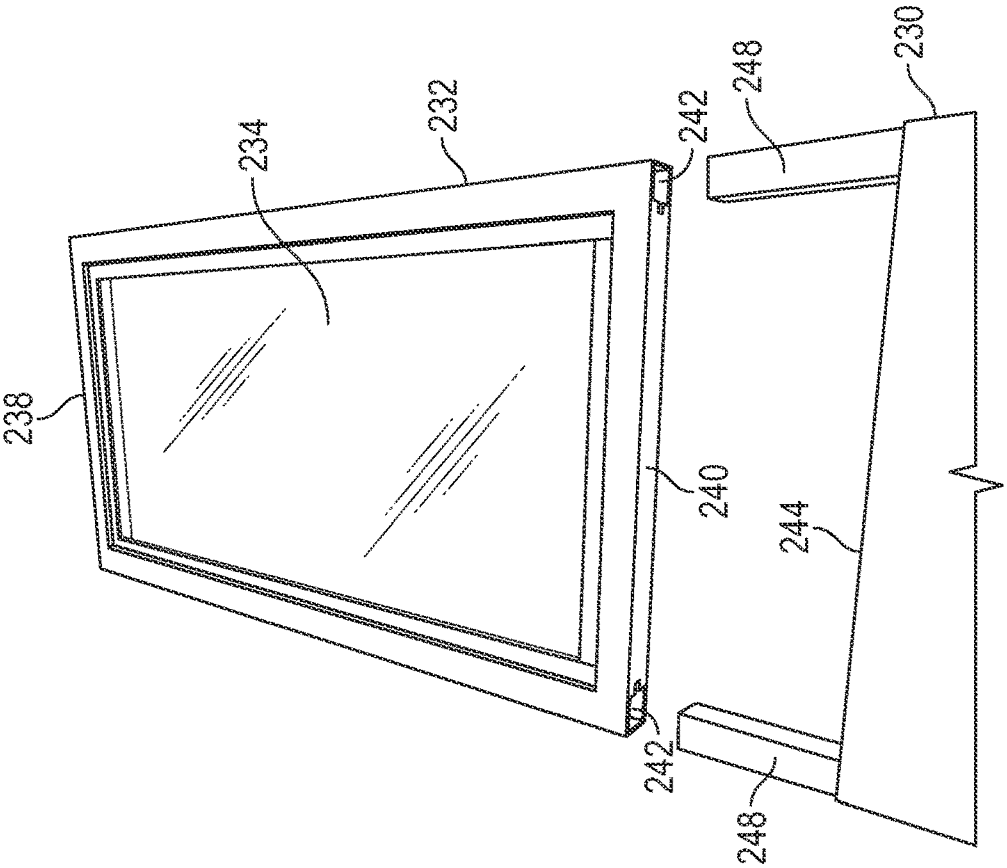
FIG. 21 is a close up view of an implementation of two poles of a detachable door.
Figure 24:
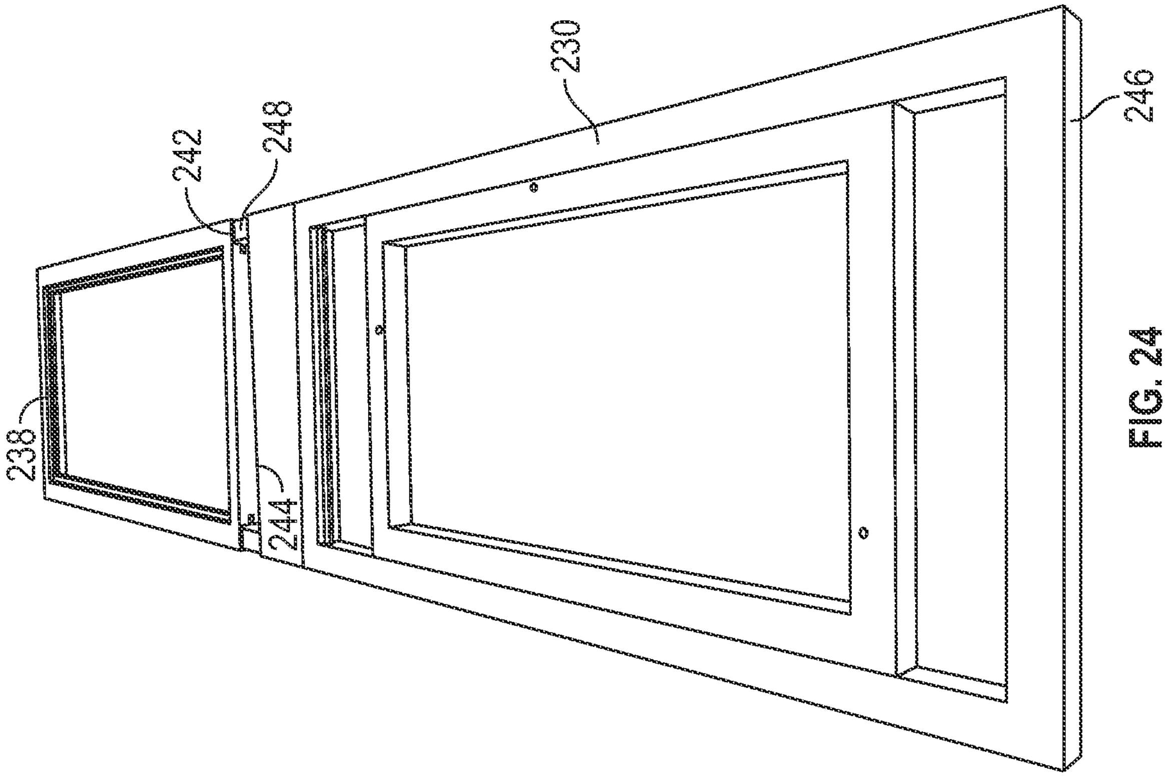
FIG. 24 is a front perspective view of an implementation of a detachable door system with the poles of the second panel meeting the openings in the first panel.
Figure 23:
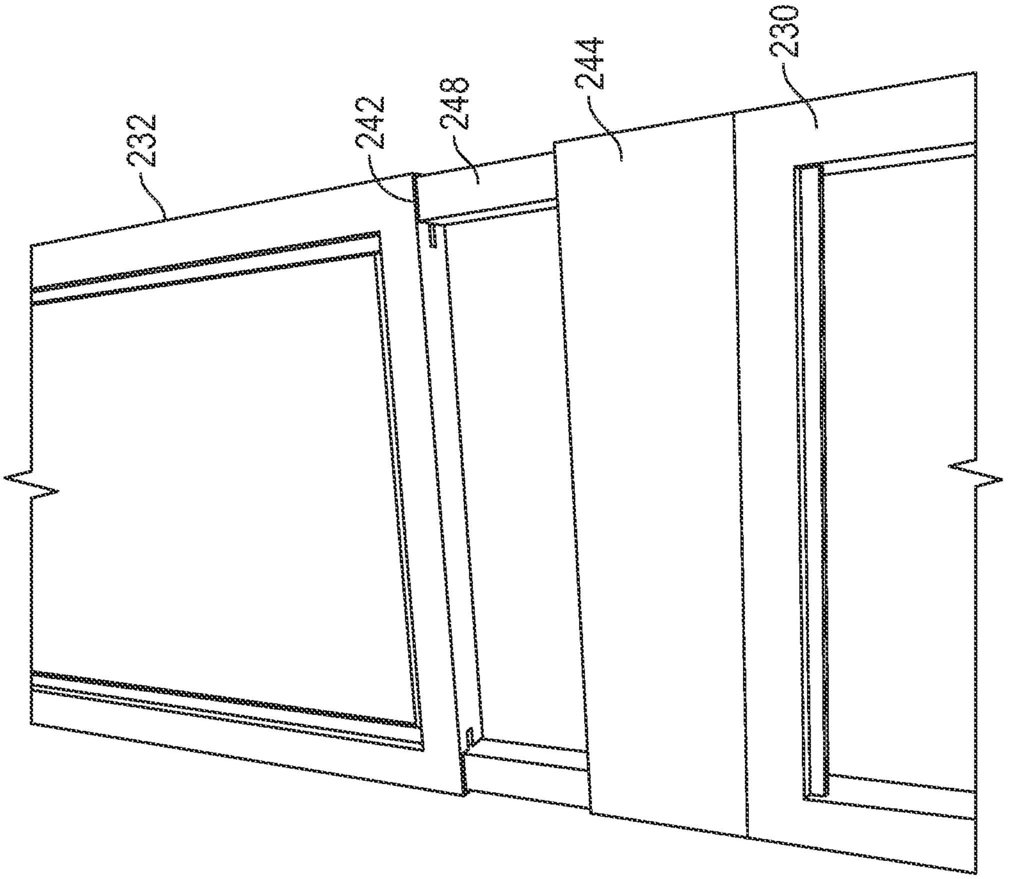
FIG. 23 is a close-up view of an implementation of a detachable door system with the poles of the second panel meeting the openings in the first panel.
Figure 26:
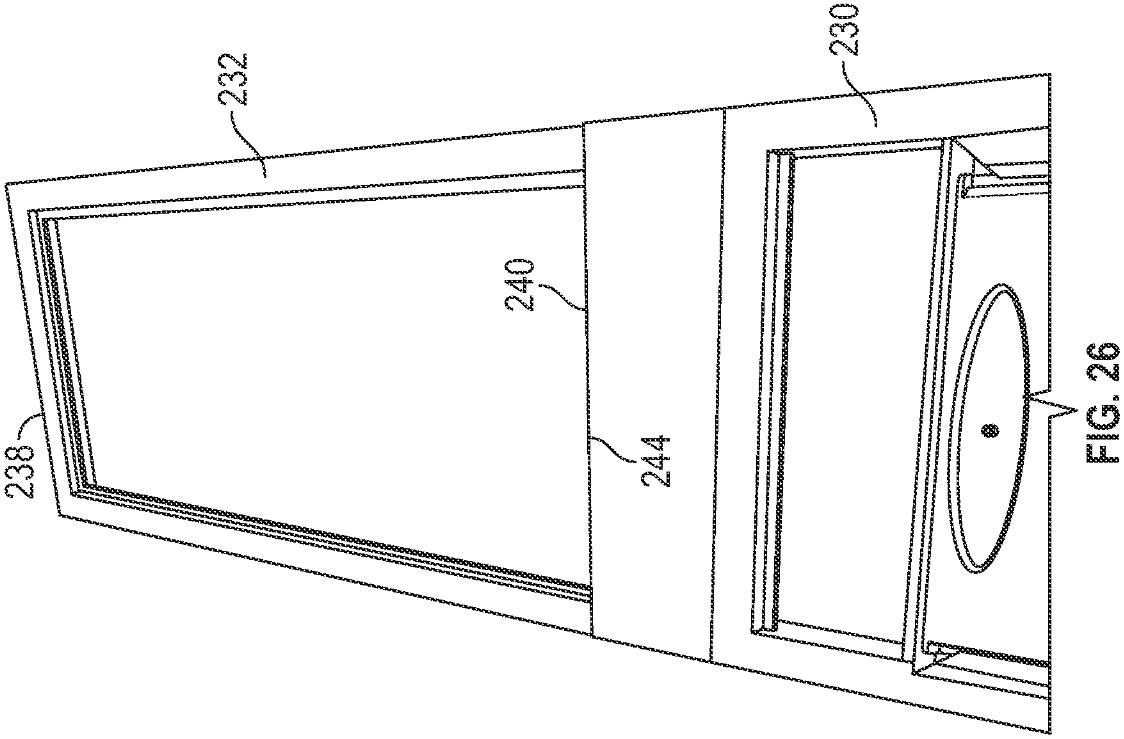
FIG. 26 is a front view of an implementation of the first panel slidably coupled with the second panel.
Figure 25:
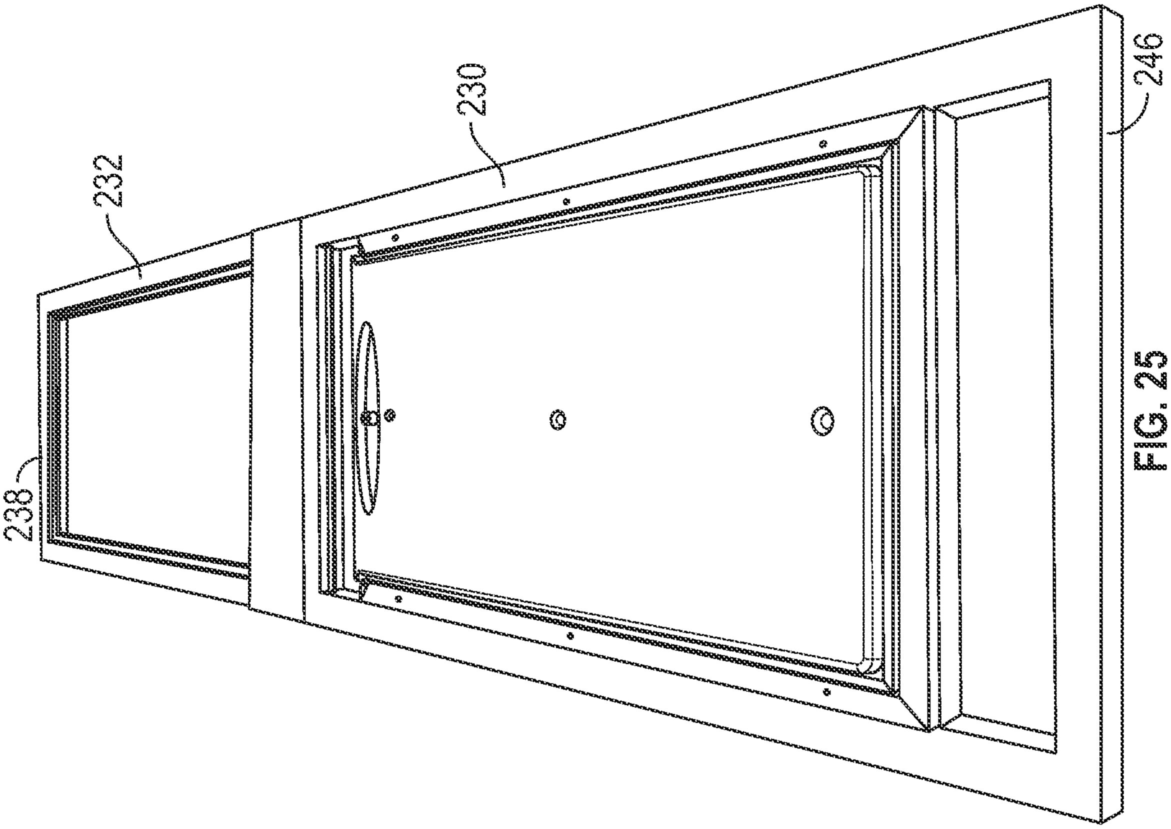
FIG. 25 is a front perspective view of an implementation of a detachable door system in a coupled position.

Referring to FIGS. 21 and 22, close-up views of the poles separated from the openings is illustrated. In FIG. 23, a close up view of the poles in the openings is illustrated. In this view, the detachable door system is in a fully extended position and is able to couple with a door having a height of 96 inches. Referring to FIG. 24, a perspective view of the detachable door system in a partially extended view is illustrated. In this particular position, the detachable door system has a height less than 96 inches but greater than 77 inches. In various other implementations, the detachable door system may fit any standard door size. Referring to FIGS. 25-26, an implementation of a detachable door system in a fully coupled position is illustrated. In this position, the detachable and extendable door system has a height of 77 inches. As illustrated, when this particular implementation of detachable door is fully coupled the poles/slides of the second panel are not visible because they are fully inserted into the openings of the first panel. Referring to FIG. 26, the first end of the first panel meets with the second end of the second panel when the detachable door system is in a fully coupled position.

Various implementations of the door systems described herein may also be used to provide an exhaust passageway from a living or workspace. For example, Referring to FIG. 1, pet door opening 28 may instead be a round shape configured to receive an exhaust hose of a portable air conditioning unit. In various implementations, the opening may have a circular shape, an oval shape, or an oblong shaped sized to receive an exhaust hose. This use of the disclosed door systems may allowable usage of portable air conditioning units that do not have windows such as, by non-limiting example, a garage, a gymnasium, or a warehouse. Referring to FIG. 19, opening 226 could also be sized to receive an exhaust hose of a portable air conditioning unit or other similar device.

Figure 28:
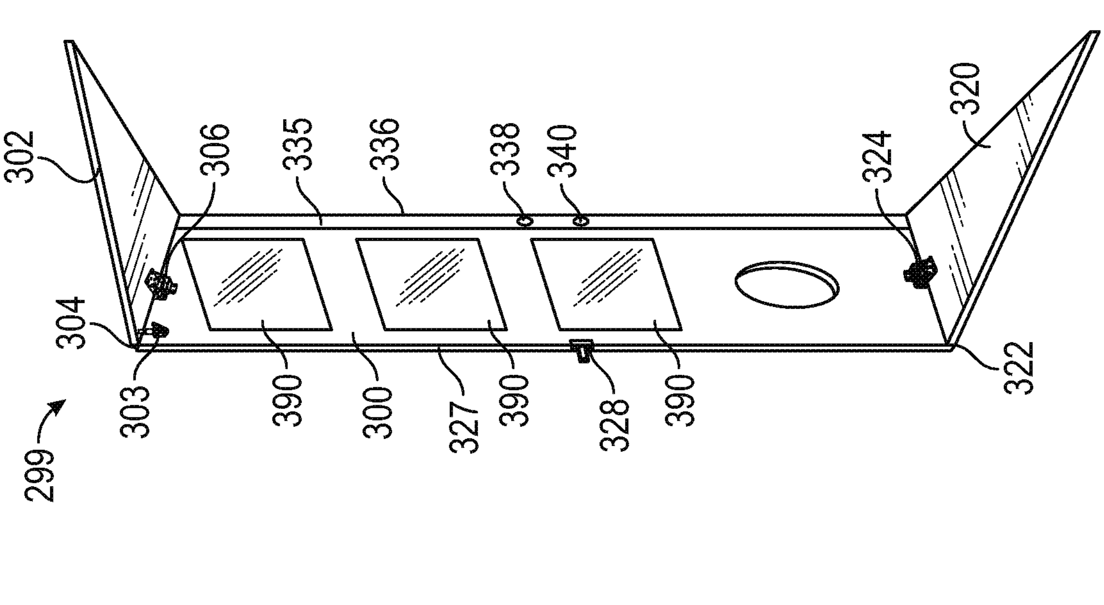
FIG. 28 is a front perspective view of an implementation of a detachable door system.

Referring to FIG. 28, an implementation of a detachable door system 299 is illustrated. Implementations of detachable door systems like those disclosed in this document are designed to fit between a swinging door and a door casing in which the door is installed. The system 299 includes a main panel 300 to which an upper panel 302 and lower panel 320 are hingedly coupled. In various implementations, hinge locking systems 306 are used to hingedly couple the upper panel 302 and lower panel 320 with the main panel 300 to allow the panels to be fixed into a desired position during operation. As will be described hereafter, these hinge locking systems 306 may be locking hinges in various implementations. Additional support for the upper panel 302 to keep it in an extended position away from the main panel 300 may be provided by a latch 303 which biases the upper panel 302 away from the main panel 300 until the latch 303 is released. In various implementations, as will be described hereafter, the latch 303 may be a toggle latch.

Along a side 327 of the main panel 300 a deadbolt coupling system 328 is coupled. The deadbolt coupling system 328 is positioned along the main panel 300 so that a deadbolt bar 330 of the system can be inserted into a deadbolt strike plate mounted to the door casing and corresponding deadbolt opening in the casing. Generally, since the main panel 300 may be oriented substantially perpendicularly to a plane formed by the door casing itself, the deadbolt bar will corresponding be oriented substantially perpendicularly to a plane formed by the main panel 300. In other implementations, however, where the main panel 300 is designed to be coupled at an angle other than perpendicular to the plane of the door casing, the deadbolt bar will be oriented at a corresponding angle to the plane of the main panel 300. Because the deadbolt coupling system 328 is designed to couple with the deadbolt strike plate of the door casing, the main panel 300 can be coupled to the door casing at that location.

Along a side 335 of the main panel 300 a door stop 336 is coupled. The door stop 336 illustrated in FIG. 28 includes a deadbolt strike plate 338 (and corresponding opening in the door stop to receive a deadbolt bar) and a door latch strike plate 340 (and a corresponding opening in the door stop 336 to receive the latch). In various implementations, however, the door stop 336 may include only a deadbolt strike plate 338 or a door latch strike plate 340. The deadbolt strike plate 338 and the door latch strike plate 340 allow a deadbolt and/or a door latch of a door hung in the door casing to be coupled to the door stop 336. In this way, the main panel 300 is coupled to the door, between the door and the door casing. In other implementations, however, the door stop may not be used, and the strike plates may be included in the main panel 300 itself. In still other implementations, the door's locking system may utilize a custom or manufacturer-specific deadbolt strike plate or door latch strike plate. For example, Andersen Corporation of Bayport, MN manufactures a reachout lock and receiver kit for certain of their manufactured doors. In such instances, the deadbolt strike plate 338 and door latch strike plate can be replaced by the custom plate(s) or associated hardware specific to the door's manufacturer so that the main panel 300 couples to the door.

In various implementations, a pet door may be included in the main panel 300 like any disclosed in this document. In other implementations, windows may be included in the main panel, which may be openable and reclosable in various implementations. Any of the locking hinge designs, deadbolt strike plates, and/or door latch strike plate implementations disclosed in this document may be employed with any of the pet door, adjustable, or windowed versions of main panels disclosed in this document. Those of ordinary skill will readily be able to select the appropriate supporting, locking, door, and latch hardware for the various panel implementations disclosed in this document using the principles disclosed herein.

In the implementation illustrated in FIG. 28, the main panel 300 includes various windows 390 and an opening configured to receive an exhaust hose is included in the main panel 300, sized and positioned to allow the exhaust hose to connect thereto. Any of a wide variety of exhaust hoses may be utilized in various implementations including, by non-limiting example, flexible, rigid, plastic, rubber, metal, and other hose types. In particular implementations, the hose may include an exhaust hose for a portable air conditioner.

Figure 29:
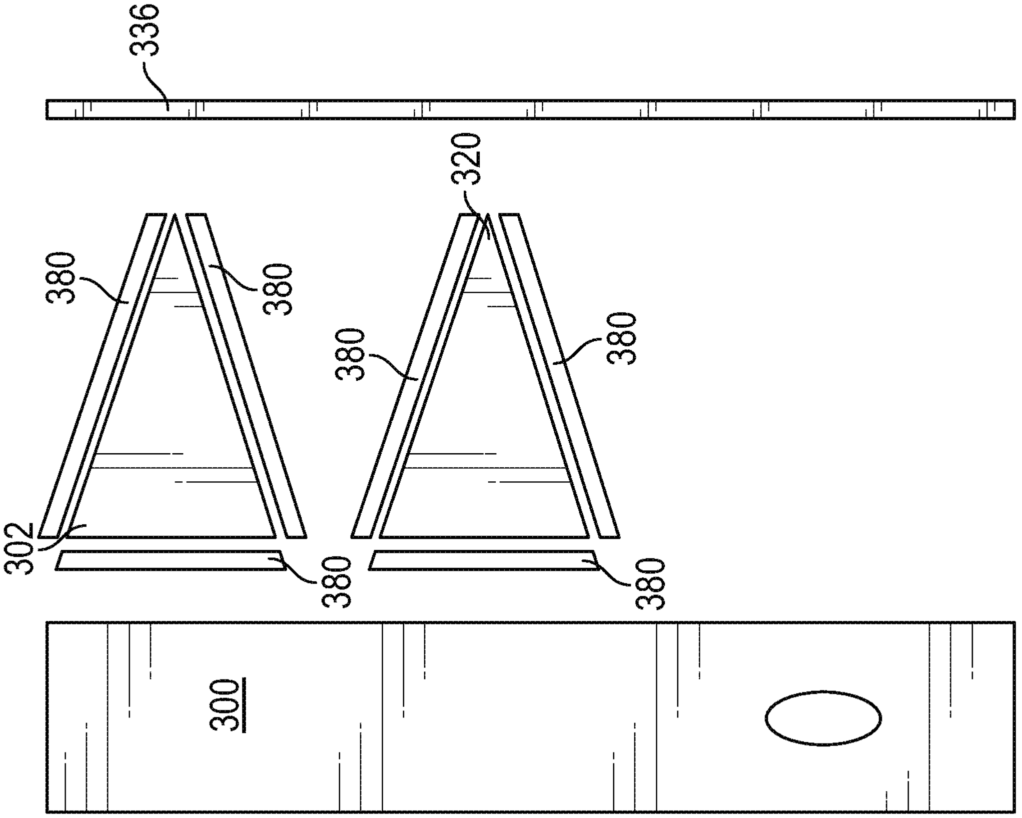
FIG. 29 is an exploded view of various components of an implementation of a detachable door system.

Referring to FIG. 29, an exploded view of several components of the implementation of a detachable door system 299 is illustrated. This view shows the outline of the main panel 300 and also shows how the upper panel 302 and lower panel 320 are triangularly shaped to fill in the space above and below the opening created by the door and main panel 300. The shape of the door stop 336 is also illustrated. Weather stripping 380 is included along the surfaces of the upper panel 302 and lower panel 320 where the panels meet the main panel 300 and meet the door and door casing to limit airflow, conserve energy, and/or prevent insects from entering at these locations.

Figure 30:
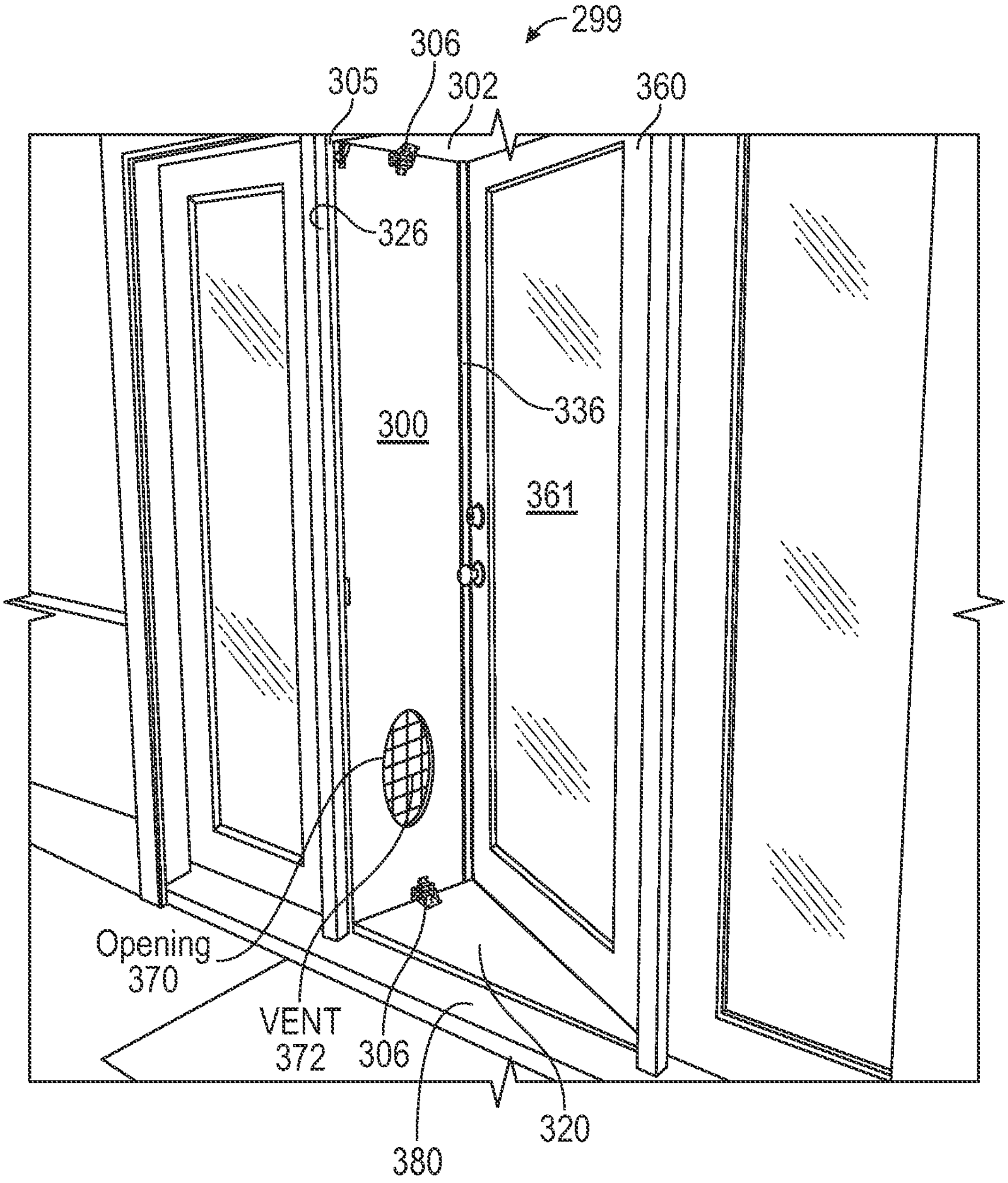
FIG. 30 is a front perspective view of an implementation of a detachable door system installed in an inswing patio door.

Referring to FIG. 30, a front view of an implementation of a detachable door system 299 is illustrated installed in an opening created by an inswing door 360 and a door casing 326. As illustrated, the lower panel 320 fills in the space between the door 360 and the door sill 380, and the upper panel 302 fills in the space between the door 360 and the upper edge 305 of the casing 326. The deadbolt and door latch of the door 360 are engaged with the corresponding strike plates in the door stop 336, and the main panel 300 is coupled with the door casing at the deadbolt strike plate of the door casing. The opening 370 of the main panel 300 is designed to receive an exhaust hose of any size and material. An exhaust vent 372 can be coupled to the opening 370 opposite the side of the opening 370 that receives the exhaust hose and includes a screen or other structure designed to prevent insects or animals from entering the hose. While the door 360 illustrated in FIG. 30 is an inswing door, system implementations may be created that can be used with outswing doors using the principles disclosed herein. Also the systems illustrated herein may be able to be used without modification for both left hung and right hung doors. The door 360 illustrated in FIG. 30 includes a single glass pane 361, which prevents the cutting of an opening. Because of this, detachable door systems disclosed herein can be used with door types that traditionally cannot be modified to include openings for exhaust discharge, such as glass pane and French doors.

Figure 31:
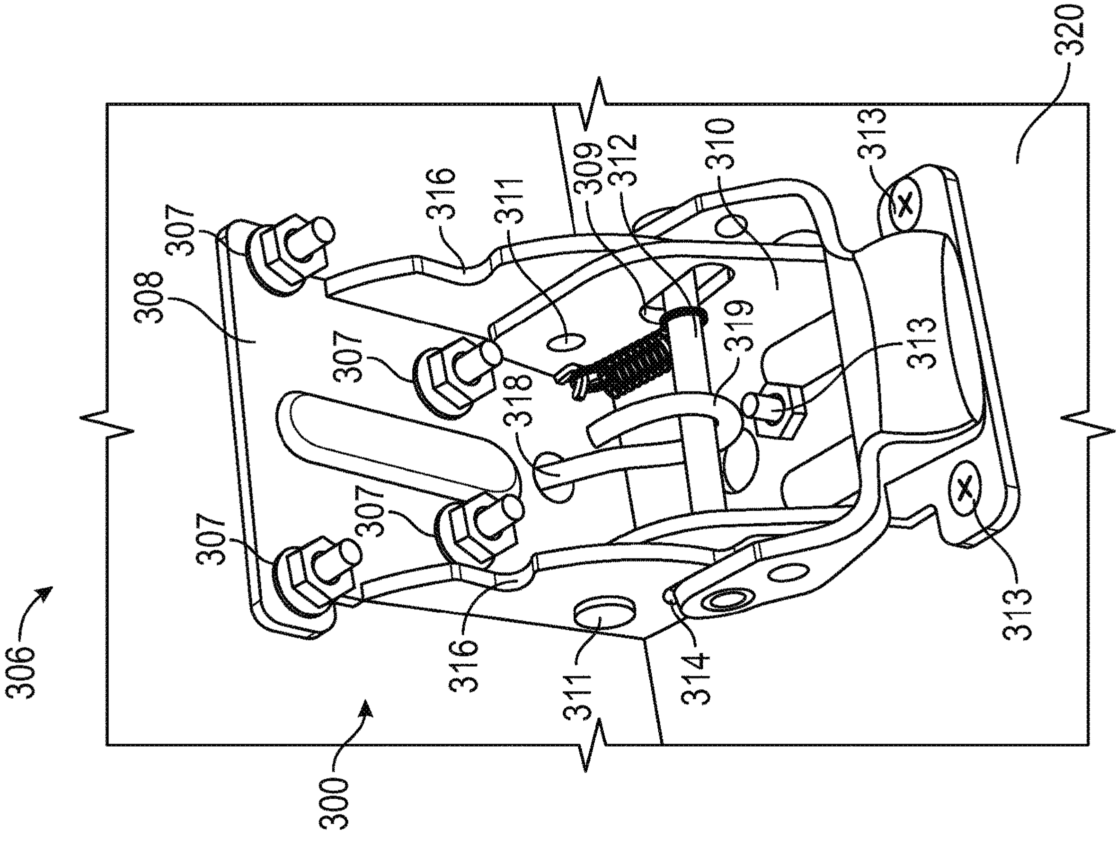
FIG. 31 is a perspective view of an implementation of a hinge locking system.

Referring to FIG. 31, an implementation of a hinge locking system 306 is illustrated. As illustrated, the hinge locking system 306 includes a fixed bracket 308, a non-fixed bracket 310, a locking pin 312 and a removable fastener 318. The fixed bracket 308 and non-fixed bracket 310 hingedly couple to one another at points 311. Locking pin 312 traverses through apertures 309 of non-fixed bracket 310 thereby non-fixedly linking the locking pin 312 and non-fixed bracket 310 together. Fixed bracket 308 carries two pairs of slots that when engaged with locking pin 312 correspond with the hinge locking system 306 being in an open position or a closed position. To illustrate, the hinge locking system 306 is in the open position when locking pin 312 engages with slots 314. However, the hinge locking system 306 is in the closed position once locking pin 312 engages with slots 316.

As shown in FIG. 31, the hinge locking system 306 hingedly couples the main panel 300 to the lower panel 320. As discussed earlier, hinge locking system 306 also hingedly couples the main panel 300 to the upper panel 302. In FIG. 31, fixed bracket 308 of the hinge locking system 306 couples to main panel 300 with fasteners 307. Non-fixed bracket 310 couples to lower panel 320 with fasteners 313. Similarly, when coupling main panel 300 to upper panel 302, the non-fixed bracket 310 of the hinge locking system couples to upper panel 320.

FIG. 31 shows the hinge locking system 306 in the open position. Functionally, removable fastener 318 secures the hinge locking system 306 in the open position by preventing the locking pin 312 from exiting the slots 314 and moving into the slots 316. By non-limiting example, removable fastener 318 may include a hooked end 319 that couples to locking pin 312. Removable fastener 318 couples to main panel 300 using a nut and bolt configuration. In other implementations, the removable fastener 318 may include some other design that couples to locking pin 312 and main panel 300, such as, by non-limiting example, a spring biased hook, a releasable clamp, a fixedly couplable clamp, or any other structure used to fasten fixedly to locking pin 312.

Figure 32:
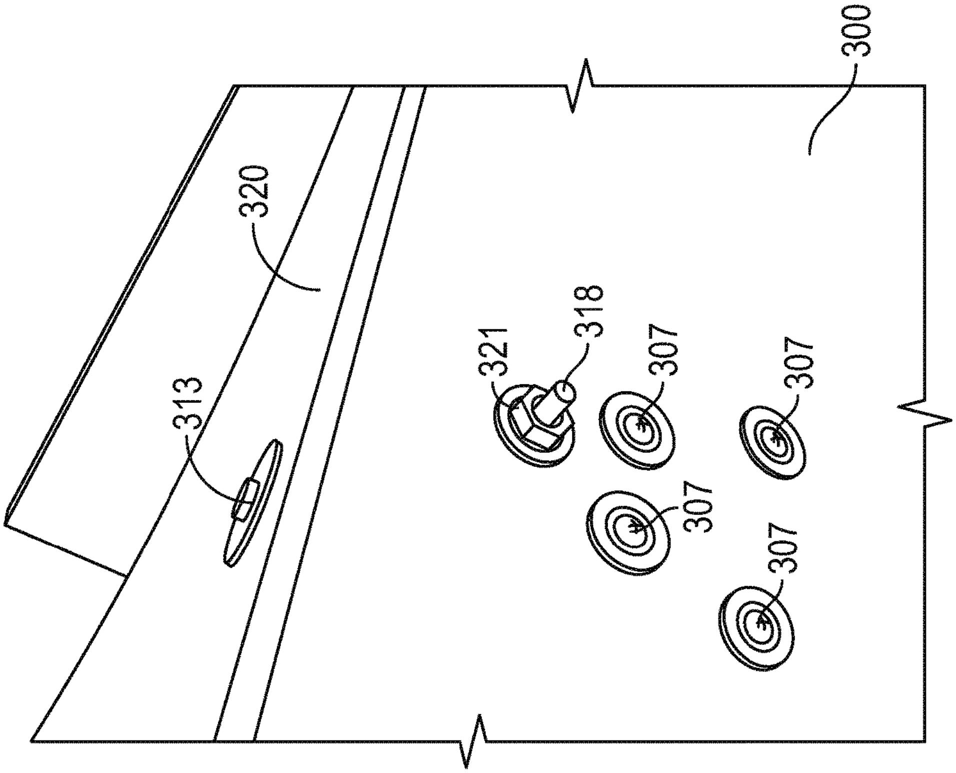
FIG. 32 is a perspective view of fastening an implementation of the hinge locking system to a main panel and to a lower panel.

FIG. 32 depicts how tension can be placed on the locking pin 312 by tightening nut 321 against main panel 300, thereby, preventing locking pin 312 from disengaging from slots 314 through the force applied by removable fastener/hook 318 around the locking pin 312. FIG. 32 also depicts fasteners 307, which couple fixed bracket 308 to main panel 300. Fastener 313 couples non-fixed bracket 310 to lower panel 320.

Figure 33:
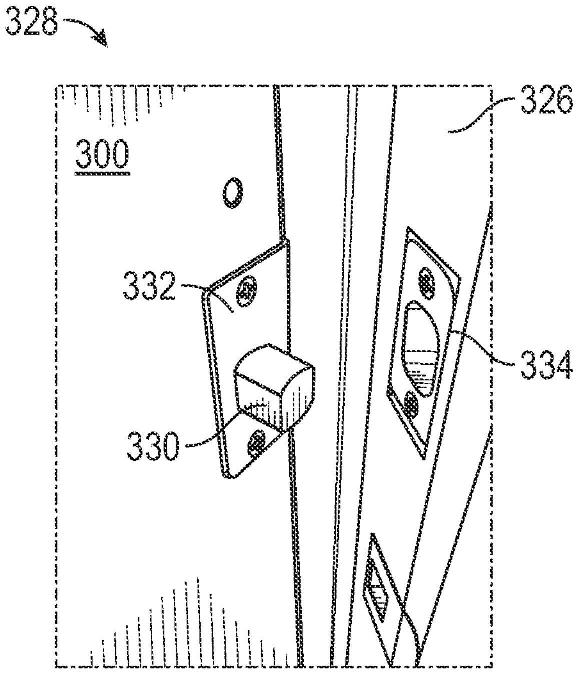
FIG. 33 is an enlarged view of an implementation of a deadbolt coupling system on an implementation of a detachable door system.

An enlarged view of the deadbolt coupling system 328 is illustrated in FIG. 33. The deadbolt coupling system 328 includes a deadbolt bar 330 coupled to a mounting plate 332. The deadbolt coupling system 328 allows the detachable door system 299 to fully engage with the door and casing 326 where it is installed at the opening where the deadbolt is inserted into the casing 326.

Figure 34:
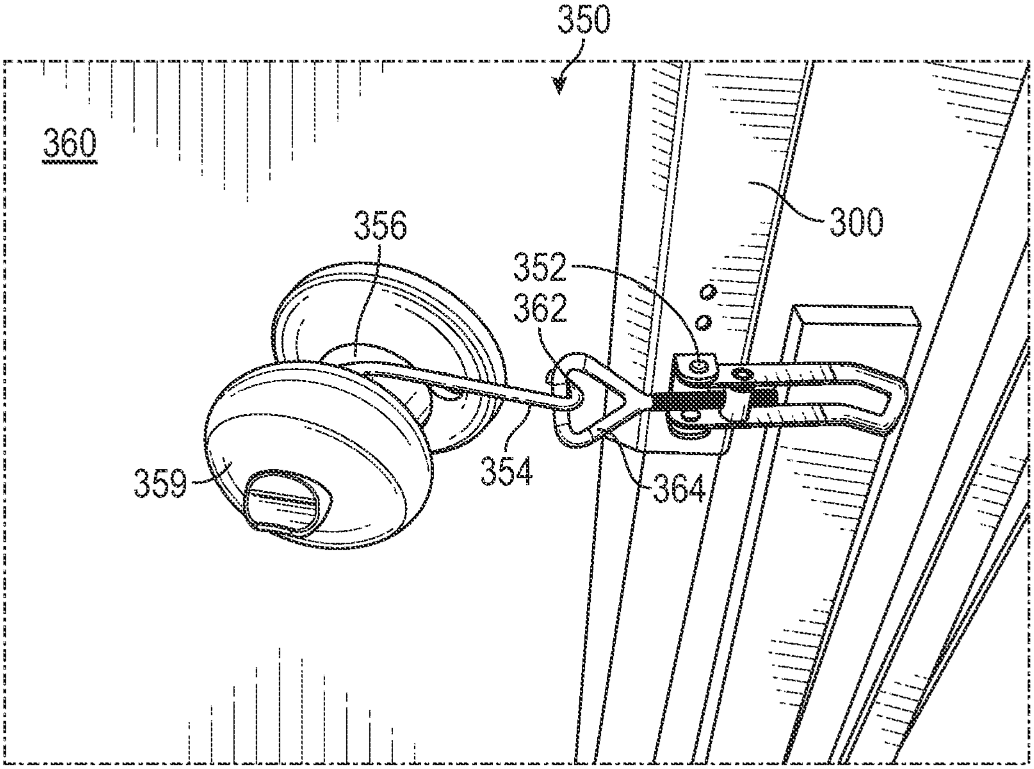
FIG. 34 is a front perspective view of an implementation of a locking system in a locked position.

Referring to FIG. 34, an implementation of a locking system 350 for an implementation is illustrated. The locking system 350 includes a toggle latch 352 coupled along a side of a main panel 300 of a detachable door system 299. In various implementations a locking system may be used with a standard door to provide extra security to a user. The locking system also includes a hook 354 that wraps around the door handle.

As illustrated in FIG. 34, an implementation of a hook 354 used in a locking system has a first end 356 and a second end 362. The first end 356 of the 354 and the second end 362 of the hook 354 may have similar sizes or one end of the hook 354 may be larger than the other end of the hook 354. By non-limiting example, the first end 356 of the hook 354 may be larger than the second end 362 of the hook 354 or the second end 362 of the hook 354 may be larger than the first end of the hook 354. In various implementations, the first end 356 of the hook 354 may be large enough to fit around the smallest end of a door knob 358 coupled to a door 360 as illustrated in FIG. 34. Referring again to FIG. 34, the second end 362 of the hook 354 may couple with a ring 364 extending from the toggle latch 352. The toggle latch 352 may be placed in a closed position to put tension on the hook 354 when the latch 352 is closed/rotated thereby locking the door 360 and detachable door system 299 from the inside and preventing the door 360 from being opened.

Figure 35:
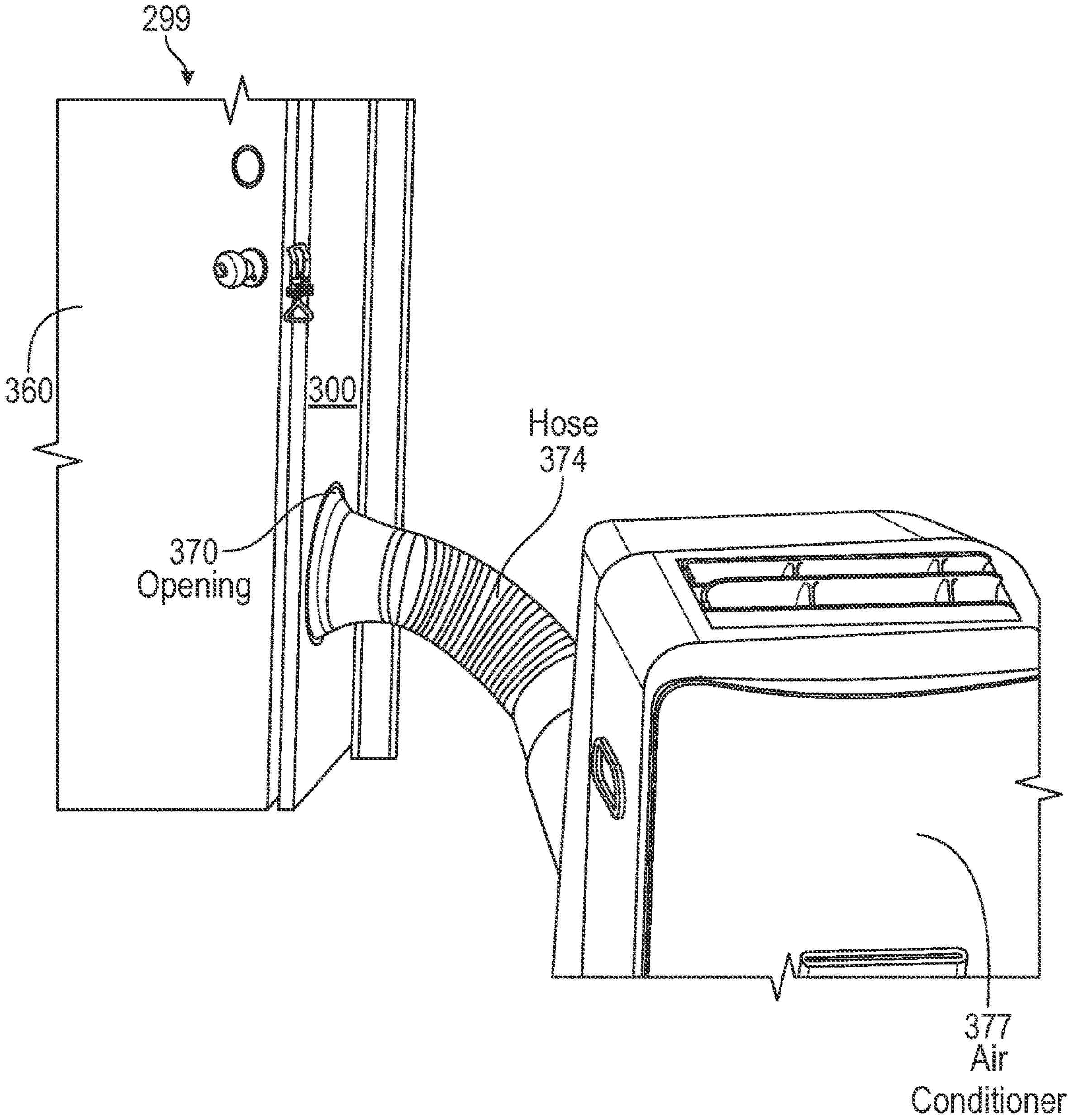
FIG. 35 is a perspective view of an implementation of a detachable door system.

FIG. 35 depicts an implementation of the detachable door system 299 installed between inswing door 360 and the door casing. Opening 370 is here receives an exhaust hose 374 from air conditioner 377. Exhaust hose 374 provides an outlet for the warm air exiting air conditioner 377. Where a heater is being used, however, the exhaust hose 374 may be an air intake hose used to bring in fresh air for heating before being released. Alternatively, where a heater is being employed, the exhaust hose 374 may be used to release exhaust from the heater (if the heater is combustion powered). A wide variety of devices requiring exhaust may be utilized with the various implementations disclosed herein that include an exhaust/air opening 370, including, by non-limiting example, saws, sanders, lathes, three-dimensional printers, laser cutters, welding systems, drills, computer numerical control machining, and many other devices needing air or exhaust.

In places where the description above refers to particular implementations of detachable door systems and implementing components, sub-components, methods and sub-methods, it should be readily apparent that a number of modifications may be made without departing from the spirit thereof and that these implementations, implementing components, sub-components, methods and sub-methods may be applied to other detachable door systems.

What is claimed is:

1. A detachable door system comprising:

a main panel, an upper panel, and a connection mechanism by which an upper side of the main panel hingedly couples to the upper panel, and the main panel is configured to couple with a door casing;

the connection mechanism comprising a hinge locking system capable of a fixed open position and a closed position, the hinge locking system comprising:

a fixed bracket secured to the main panel, the fixed bracket hingedly coupled to a non-fixed bracket secured to the upper panel;

a locking pin slidable in a pair of apertures in the non-fixed bracket to engage in a first pair of slots in the fixed bracket corresponding with the fixed open position and slidable in the pair of apertures in the non-fixed bracket to engage in a second pair of slots in the fixed bracket corresponding with the closed position; and a removable fastener engageable with the locking pin to hold the locking pin in the first pair of slots and prevent the locking pin from moving slidably in the pair of apertures in the non-fixed bracket into the second pair of slots corresponding with the closed position.

2. The system of claim 1, wherein the removable fastener is configured to couple the locking pin to the main panel.

3. The system of claim 1, further comprising a second connection mechanism configured to hingedly couple a lower panel to a lower side of the main panel, wherein the second connection mechanism comprises a second hinge locking system.

4. The system of claim 1, wherein the main panel attaches to the door casing using a deadbolt coupling system coupled to a side of the main panel, the deadbolt coupling system comprising a deadbolt bar coupled to a mounting plate, wherein the deadbolt bar is configured to couple into a deadbolt strike plate opening of the door casing.

5. The system of claim 1, wherein the main panel comprises one or more windows therein, the one or more windows configured to be mechanically openable by a user.

6. The system of claim 1, further comprising a door stop coupled to a side of the main panel, the door stop comprising a deadbolt strike plate, a door latch strike plate, or both a deadbolt strike plate and a door latch strike plate.

7. The system of claim 1, further comprising a locking system comprising a toggle latch coupled along and to a side of the main panel and a hook, the hook having a first curved end and a second curved end, the first curved end of the hook coupled with a door knob of a door hung within the door casing and the second curved end of the hook coupled with a ring extending from the toggle latch.

8. A detachable door system comprising:

a main panel comprising at least one opening configured to receive an exhaust hose, an upper panel, and a connection mechanism hingedly coupling the main panel with the upper panel;

wherein the connection mechanism comprises a hinge locking system configured to move to a fixed open position and to a closed position, the hinge locking system comprising:

a fixed bracket secured to the main panel and hingedly coupled to a non-fixed bracket secured to the upper panel;

a locking pin slidable in a pair of apertures in the non-fixed bracket to engage in a first pair of slots in the fixed bracket corresponding to the fixed open position and slidable in the pair of apertures in the non-fixed bracket to engage in a second pair of slots in the fixed bracket corresponding to the closed position; and a removable fastener engageable with the locking pin to hold the locking pin the first pair of slots and prevent the locking pin from moving slidably in the pair of apertures in the non-fixed bracket into the second pair of slots corresponding to the closed position.

9. The system of claim 8, wherein the removable fastener is configured to couple the locking pin to the main panel.

10. The system of claim 8, further comprising a second connection mechanism hingedly coupling a lower panel to a lower side of the main panel, the second connection mechanism comprising a second hinge locking system.

11. The system of claim 8, wherein the main panel is configured to couple with a door casing using a deadbolt coupling system coupled to a side of the main panel, the deadbolt coupling system comprising a deadbolt bar coupled to a mounting plate, the deadbolt bar configured to couple into a deadbolt strike plate opening of the door casing.

12. The system of claim 8, wherein the main panel comprises one or more windows therein, the one or more windows configured to be mechanically openable by a user.

13. The system of claim 8, further comprising a door stop coupled to a side of the main panel, the door stop comprising a deadbolt strike plate, a door latch strike plate, or both a deadbolt strike plate and a door latch strike plate.

14. The system of claim 8, wherein the exhaust hose is positioned on a first side of the main panel and an exhaust vent is positioned on a second side of the main panel opposite the first side.

* * * * *